Figure 19:
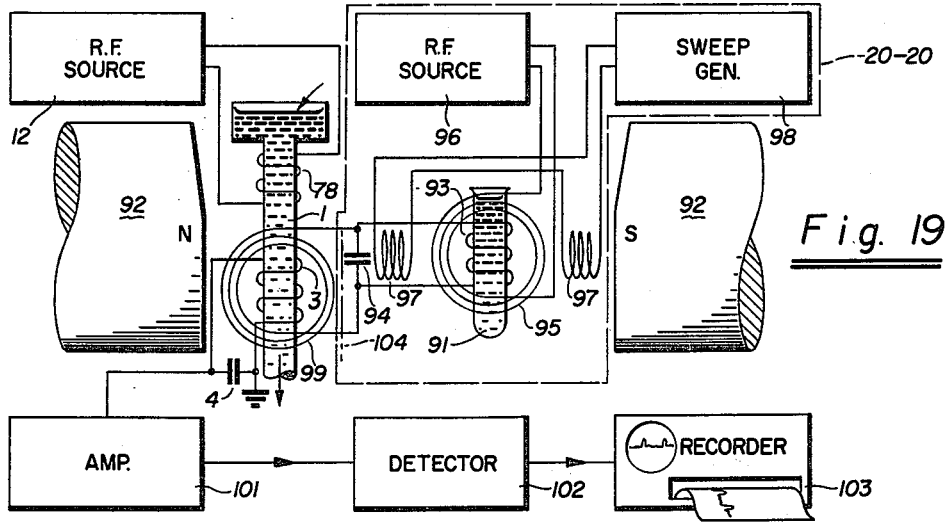

Jan. 22, 1963   W. A. ANDERSON ETAL   3,075,156
GYROMAGNETIC METHOD AND APPARATUS
Filed May 2, 1957   7 Sheets-Sheet 1
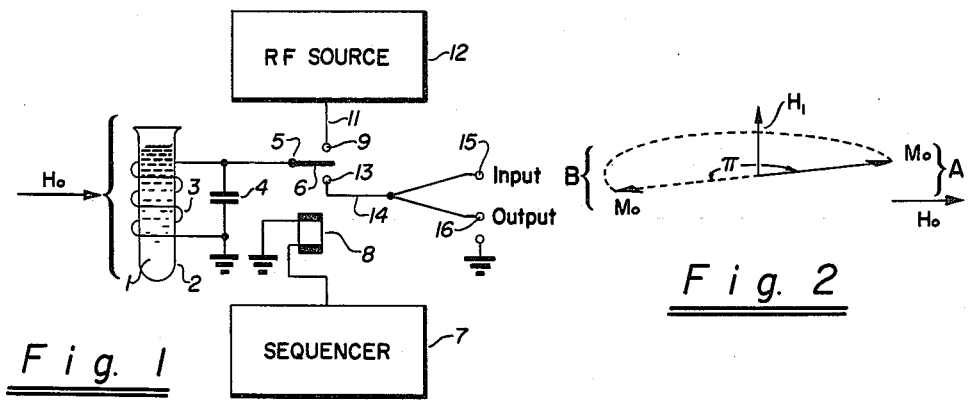
Fig. 1
Fig. 2
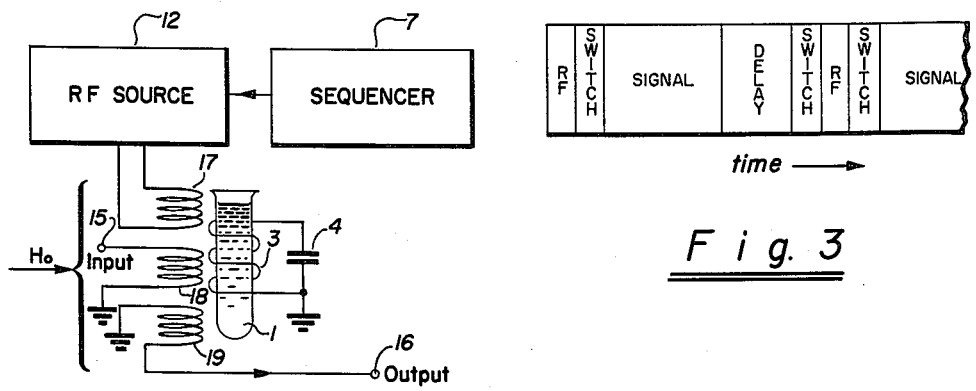
Fig. 3
Fig. 4
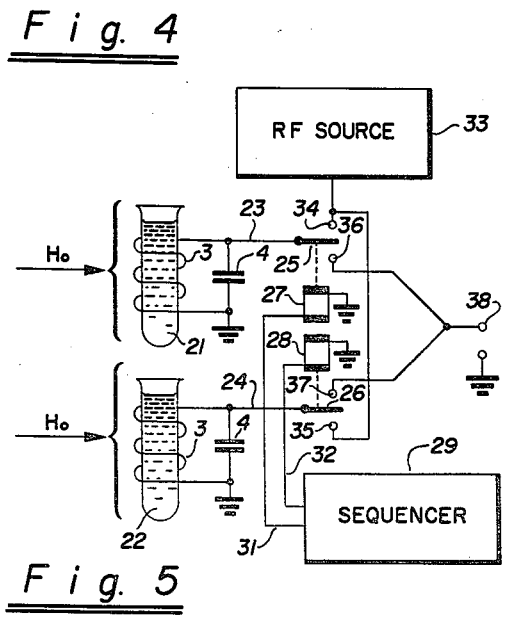
Fig. 5
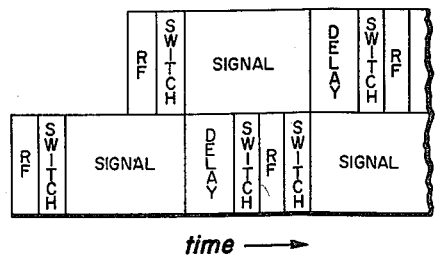
Fig. 6
INVENTORS.
Weston A. Anderson
James T. Arnold
Felix Bloch
BY
Paul B. Hunter
Attorney

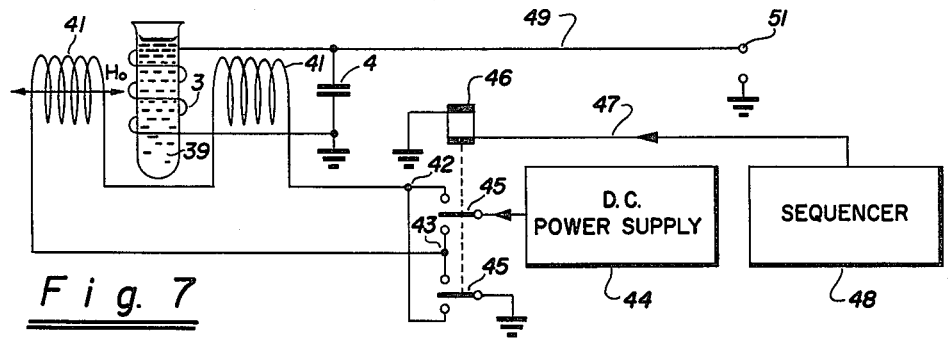
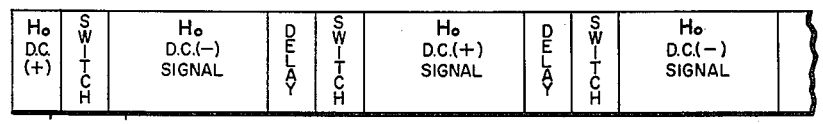
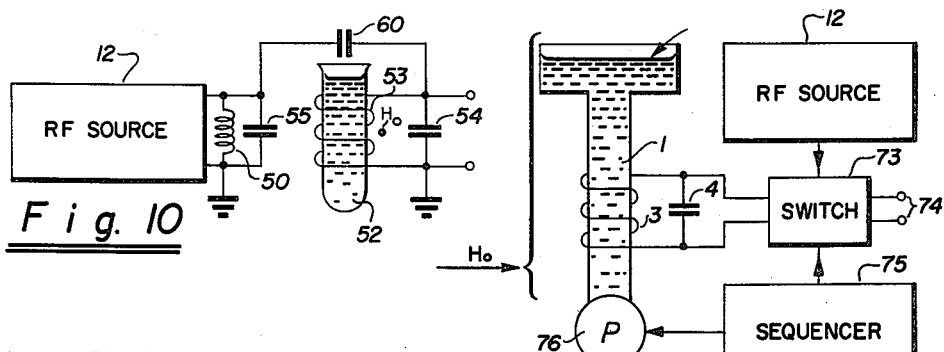
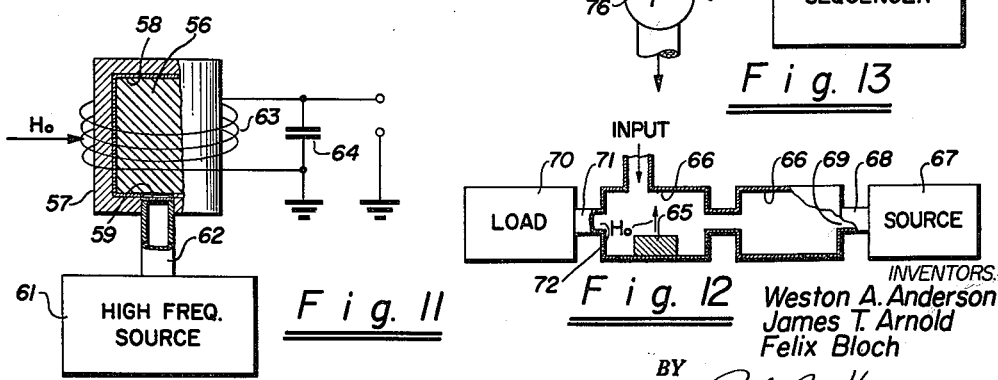
INVENTORS.
Weston A. Anderson
James T. Arnold
Felix Bloch
BY
Paul B. Hunter
Attorney

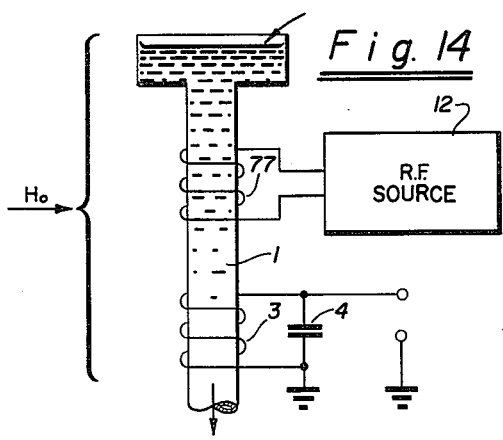
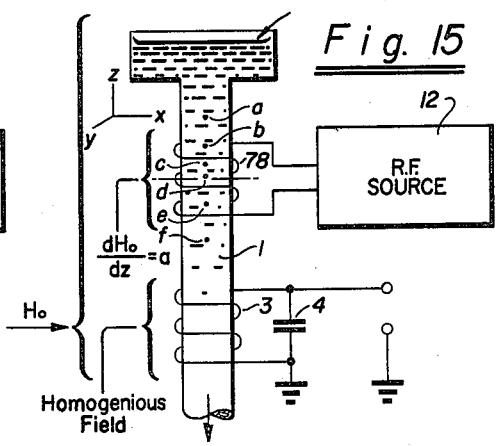
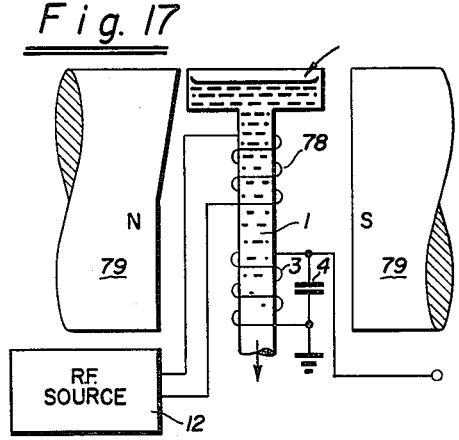
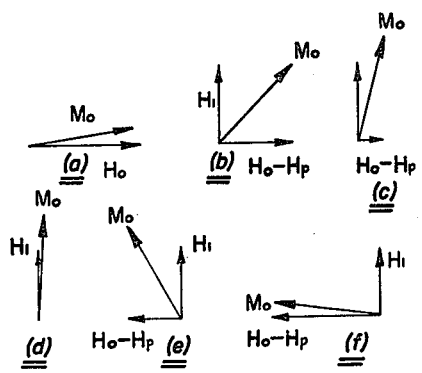
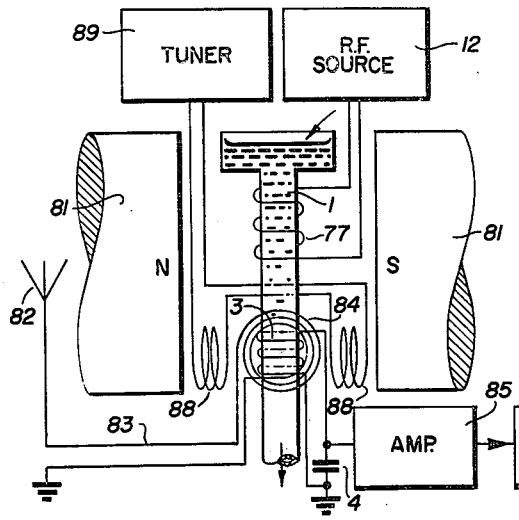
INVENTORS.
Weston A. Anderson
James T. Arnold
Felix Bloch Jan. 22, 1963    W. A. ANDERSON ETAL    3,075,156
GYROMAGNETIC METHOD AND APPARATUS
Filed May 2, 1957    7 Sheets-Sheet 4

INVENTORS.
Weston A. Anderson
James T. Arnold
Felix Bloch
BY
Paul B. Hunter
Attorney

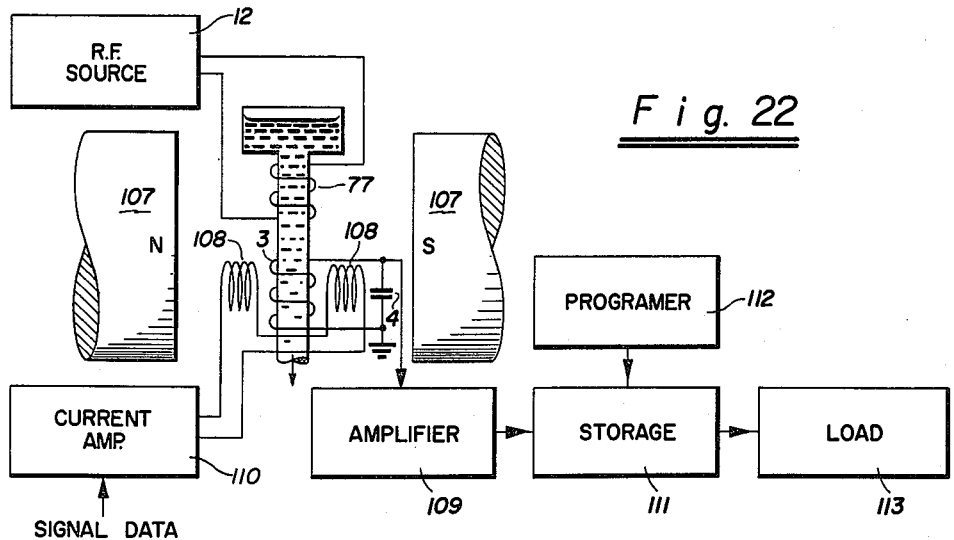
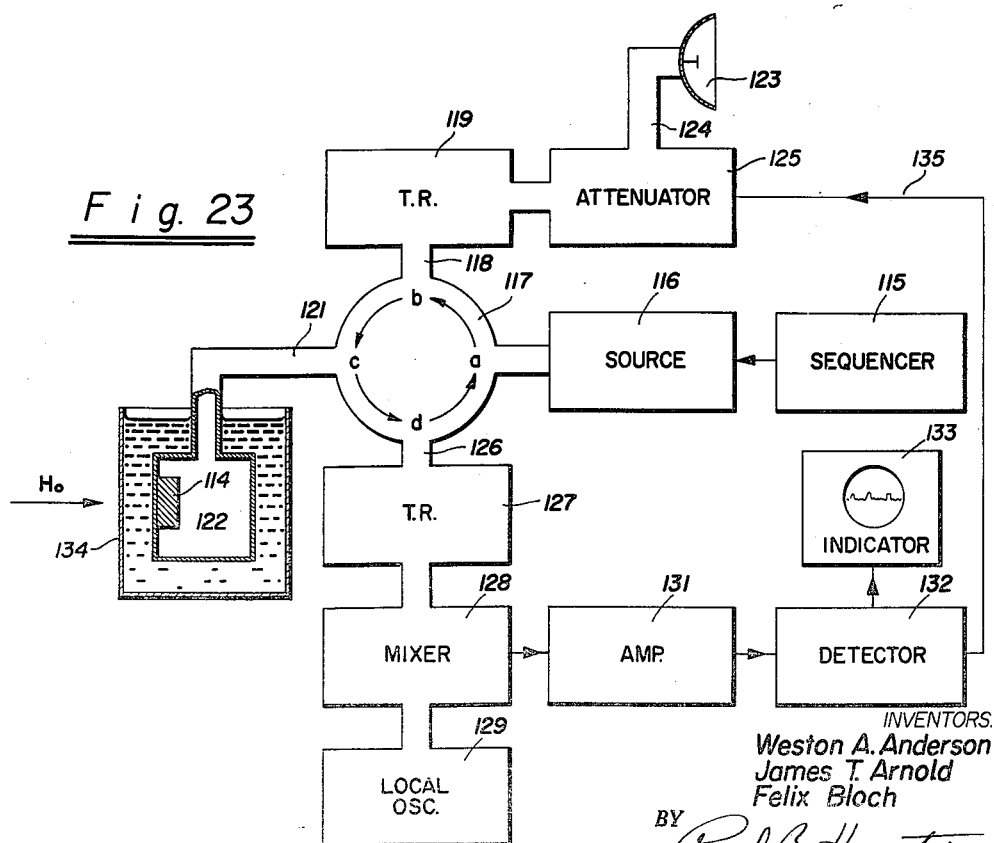

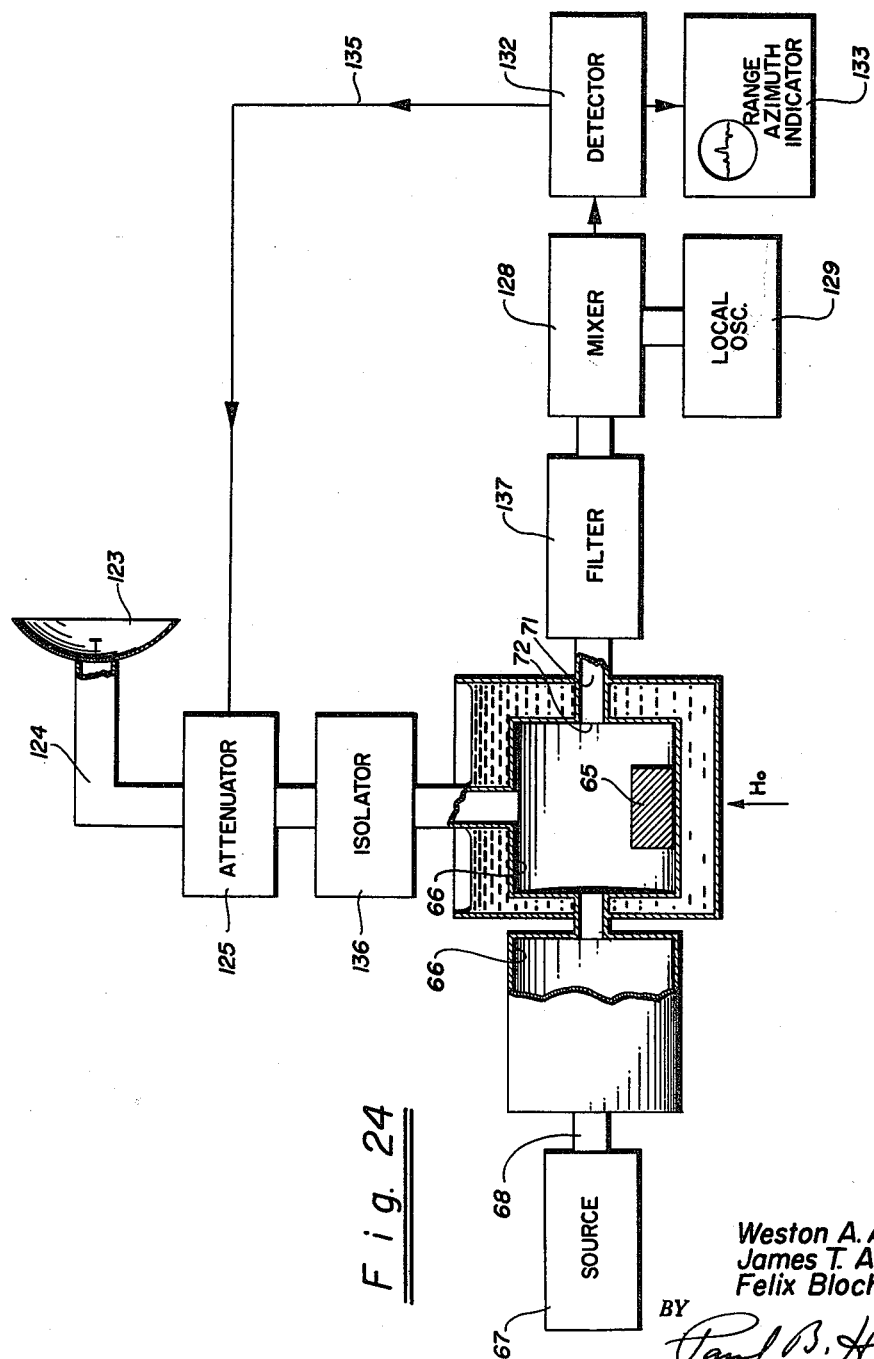

INVENTORS.
Weston A. Anderson
James T. Arnold
Felix Bloch

United States Patent Office 3,075,156
Patented Jan. 22, 1963

3,075,156
GYROMAGNETIC METHOD AND APPARATUS
Weston A. Anderson, James T. Arnold, and Felix Bloch, Palo Alto, Calif.; said Anderson and said Arnold assignors to Varian Associates, Palo Alto, Calif., a corporation of California
Filed May 2, 1957, Ser. No. 656,606
32 Claims. (Cl. 331—94)

The present invention relates in general to gyromagnetic methods and apparatus and more specifically to novel methods and apparatus for obtaining amplification or oscillation by stimulated coherent emission of radiation from an ensemble of gyromagnetic bodies having a higher energy state more densely populated than a lower energy state. The present invention is extremely useful for various purposes including obtaining very low noise amplification of relatively weak signals, for obtaining extremely stable and easily tunable frequency sources, for sensing the intensity of magnetic fields, for converting signals at one frequency to signals at a second frequency, for transforming minute current information into frequency information which may be used to advantage in certain data processing applications, for high resolution gyromagnetic spectroscopy, for extremely sensitive radiometry, for radar and for other important uses.

Heretofore, a device has been devised for obtaining microwave amplification or oscillation by stimulated emission of radiation from a beam of ammonia molecules having a preponderance of the molecules making up the beam in a nonequilibrium energy state. This prior art device is known as the ammonia maser and has certain inherent disadvantages which have been overcome by the novel present invention. In particular, the ammonia maser is inherently a fixed frequency device. The frequency of the stimulated emission arises due to transitions of the ammonia molecules from their higher to their lower energy state and these two energy states are determined by the configuration of the molecule and not due to angular momentum and magnetic moment in the same manner as encountered with gyromagnetic bodies. Since the configuration of the ammonia molecule is not a function of a known easily varied parameter the frequency of radiation is not easily varied. Furthermore, molecular beam type devices have a relatively small power handling capacity and small maximum power gain due to the low density of the molecular beams. Low density molecular beams are required to reduce collisions between molecules. Molecular collisions will tend to destroy the nonequilibrium energy state which is necessary for the desired action of the device.

The present invention provides methods and apparatus for obtaining extremely low noise, narrow band, amplification or oscillation. The present invention has added advantages over the molecular beam-type masers by providing wide range tunability and much higher realizable power gains.

The mode of operation of the present invention is to put an ensemble of gyromagnetic bodies, normally in thermal equilibrium at some certain energy level, into a certain higher energy level. The certain higher energy level must have a lifetime which is longer than the period of time which it is desired to use the ensemble for oscillation or amplification. While the ensemble is in the higher energy state the bodies are stimulated to coherently give up or radiate their energies spontaneously for oscillation purposes or in response to an applied signal for amplification purposes. (The radiation is then detected and fed to a load.)

A gyromagnetic ensemble as utilized herein is defined to mean a group of gyromagnetic bodies which externally appear to have the same gyromagnetic ratio. For example, an electron which is exposed to various magnetic and electric fields serving to produce a plurality of energy levels between which transitions may be induced would be a member of a plurality of ensembles, one ensemble corresponding to each possible transition. The hydrogen nuclei or protons of a sample of water form an ensemble of gyromagnetic bodies. When the sample of water is immersed in a unidirectional magnetic field the ensemble of protons reach a certain thermal equilibrium energy state. The proton gyromagnetic system may then be placed in a higher energy state by a number of different methods but one method is by a rapid reversal of the polarizing magnetic field. The lifetime of this nonequilibrium energy state is in the order of 2 to 3 seconds. During these 2 or 3 seconds the proton gyromagnetic system may be stimulated in the proper manner to coherently give up energy to an output circuit.

Depending upon how the output circuit is coupled to a given gyromagnetic ensemble the device can be made to operate as a regenerative oscillator or as an amplifier. The regenerative oscillation or amplification is produced by the stimulated coherent transitions of the gyromagnetic ensemble from the higher to the lower energy state. The coherent transitions occur due to the close coupling between a tuned circuit and the ensemble whereby currents induced in the tuned circuit due to transitions of the ensemble produce a time varying magnetic field which acts back on the ensemble to maintain coherence of the transitions. The oscillation or amplification thus produced will be very nearly noise free. The stimulated transitions just described may take place under either transient or steady state conditions.

The principal object of the present invention is to provide novel methods and apparatus for producing and utilizing stimulated coherent emission of radiation from ensembles of gyromagnetic bodies.

One feature of the present invention is the provision of novel methods and apparatus for obtaining oscillation or amplification from an ensemble of gyromagnetic bodies in a nonequilibrium energy state. An output circuit is closely coupled to the ensemble in a certain manner whereby the ensemble is perturbed due to the closeness of the coupling and thereby induced to coherently give up its energy to the circuit spontaneously or in response to an applied signal, as desired.

Another feature of the present invention is the novel method and apparatus for producing regenerative oscillation from an ensemble of gyromagnetic bodies in a nonequilibrium energy state wherein the following conditions are prescribed:

$$T_2 > +\frac{1}{2\pi|\gamma|Q\eta M_0}$$

where: $T_2$ is the transverse relaxation time of the gyromagnetic ensemble, $|\gamma|$ is the magnitude of the gyromagnetic ratio, $Q$ is the quality factor of the ensemble perturbing circuit, $\eta$ is the filling factor of the ensemble perturbing circuit, and $M_0$ is the magnitude of the total magnetic moment of the ensemble in the nonequilibrium state. $\eta$ is defined as:

$$\frac{\int H_c^2 \sin^2 \theta \, dv}{\underset{\text{sample volume}}{\int H_c^2 \, dv}}$$
$$\underset{\text{all space}}{\int H_c^2 \, dv}$$

where $H_c$ is the magnetic field created by current flowing in the circuit, and $\theta$ is the angle between $H_c$ and $H_0$.

Another feature of the present invention is the provision of novel methods and apparatus for producing amplification of signals at or near the Larmor frequency of an ensemble of gyromagnetic bodies in a nonequilibrium energy state wherein the following conditions are prescribed:

$$T_2 \cong + \frac{1}{2\pi |\gamma| Q \eta M_0}$$

Another feature of the present invention is the provision of novel methods and apparatus for utilizing an ensemble of gyromagnetic bodies in a nonequilibrium energy state wherein the gyromagnetic ensemble is put into the nonequilibrium state in a region removed from the influence of an energy extraction and utilization circuit. Then the ensemble is brought into the region of influence of the energy extraction and utilization circuit within a time period which is short compared to the longitudinal relaxation time $T_1$ of the gyromagnetic ensemble whereby more efficient utilization of the gyromagnetic ensemble is obtained.

Another feature of the present invention is the provision of novel methods and apparatus for raising a first ensemble of gyromagnetic bodies to a nonequilibrium energy state wherein said first ensemble of bodies is put into the nonequilibrium state through interaction with a second ensemble of gyromagnetic bodies. The second ensemble of gyromagnetic bodies being closely coupled to the first ensemble and said second ensemble being in a state of gyromagnetic resonance.

Another feature of the present invention is the provision of a novel frequency converter wherein a signal at one frequency is applied to a second ensemble of gyromagnetic bodies to produce resonance thereof and said second ensemble through interaction with a first ensemble serves to maintain said first ensemble in a nonequilibrium state. The first ensemble is then stimulated to produce coherent emission at a second frequency.

Another feature of the present invention is the provision of novel methods and apparatus for putting an ensemble of gyromagnetic bodies into a nonequilibrium energy state wherein the ensemble is immersed in a polarizing magnetic field, said field running in a certain direction. Then the direction of the polarizing magnetic field is rapidly reversed to produce a nonadiabatic transition of the gyromagnetic ensemble and thereby placed the ensemble in a higher energy state.

Another feature of the present invention is the provision of novel methods and apparatus for putting an ensemble of gyromagnetic bodies into a nonequilibrium energy state wherein the bodies are subjected to a time varying magnetic field at a frequency near the Larmor frequency for a certain period of time and of a certain magnitude to thereby raise the gyromagnetic ensemble to a nonequilibrium energy state.

Another feature of the present invention is the provision of novel methods and apparatus for putting an ensemble of gyromagnetic bodies into a nonequilibrium energy state wherein the gyromagnetic bodies are subjected to a slowly changing magnitude of polarizing field and simultaneously therewith subjected to energy of a frequency which corresponds to the Larmor frequency of substantially the median intensity of the magnetic field to thereby put the gyromagnetic ensemble in a higher energy state.

Another feature of the present invention is the provision of novel methods and apparatus for chemical analysis wherein a sample of matter containing an ensemble of gyromagnetic bodies is analyzed by producing gyromagnetic resonance of the bodies in a polarizing magnetic field. A gyromagnetic resonance signal at the Larmor frequency of the first ensemble of gyromagnetic bodies is then derived from said first ensemble and applied to a second ensemble of gyromagnetic bodies which has been placed in a nonequilibrium energy state. The resonance signal is applied to the second ensemble of gyromagnetic bodies in such a manner as to produce amplification of the resonance signal in an energy extraction and utilization circuit coupled to said second ensemble of gyromagnetic bodies whereby extremely stable and low noise resonance spectra are obtained.

Another feature of the present invention includes the provisions of the preceding feature plus the provisions of a third ensemble of gyromagnetic bodies immersed in a polarizing field having substantially the same minute fluctuations with time as the first mentioned polarizing field. An energy extraction and utilization circuit is coupled to the third ensemble in such a manner as to produce oscillatory signals in said circuit at the Larmor frequency of said third ensemble of gyromagnetic bodies. Said oscillatory signals are then applied to the first ensemble of gyromagnetic bodies under chemical analysis to thereby produce extremely stable gyromagnetic resonance of said first ensemble of gyromagnetic bodies.

Another feature of the present invention is the provision of novel methods and apparatus for providing a data processing component useful in data processing machines wherein bits of information in the current domain are transformed into bits of information in the frequency domain through the intermediary of an ensemble of gyromagnetic bodies. The ensemble of gyromagnetic bodies is put into a nonequilibrium energy state and coherent emission stimulated therefrom. The frequency of said emission being a function of the polarizing field which is varied in accordance with the bits of current information to thereby produce corresponding bits of information in the frequency domain. Due to the linear relationship between the polarizing magnetic field applied to the gyromagnetic bodies and the Larmor resonance frequency an extremely linear transformation is obtained between the current domain and the frequency domain.

Another feature of the present invention is the provision of novel methods and apparatus for determining the temperature of bodies at remote locations or determining the location of bodies of differing temperatures wherein the thermally caused electromagnetic radiation from such bodies is applied to an ensemble of gyromagnetic bodies in a nonequilibrium energy state to produce amplification of the radiation whereby extremely high sensitivity may be obtained.

Figure 20:
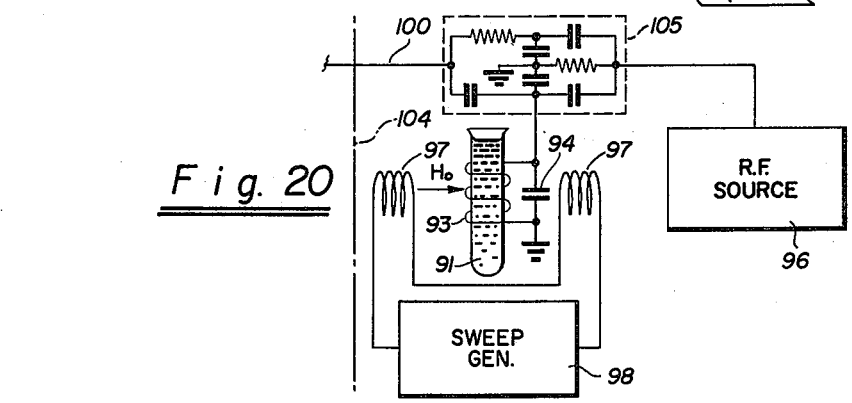
Figure 21:
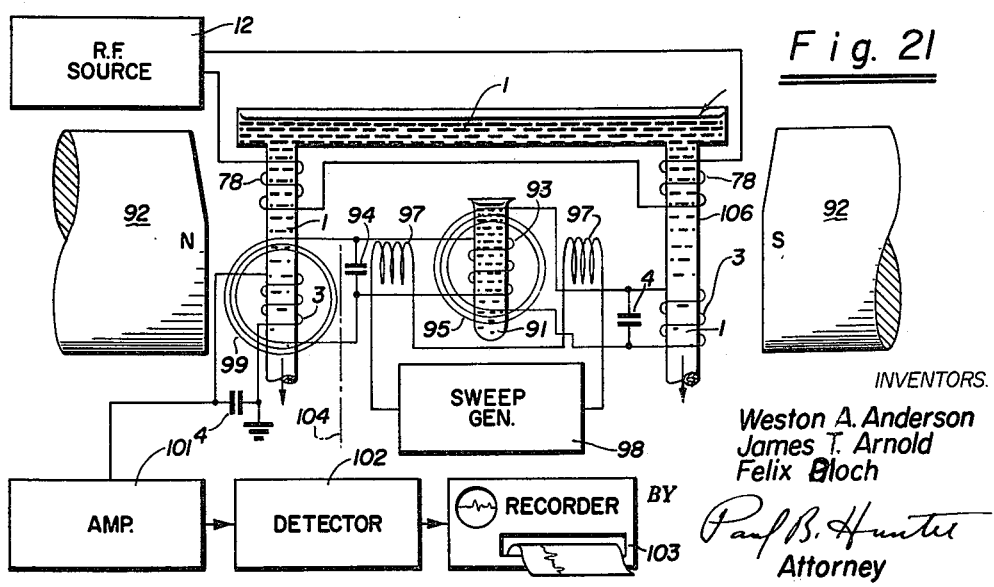
Figure 25:
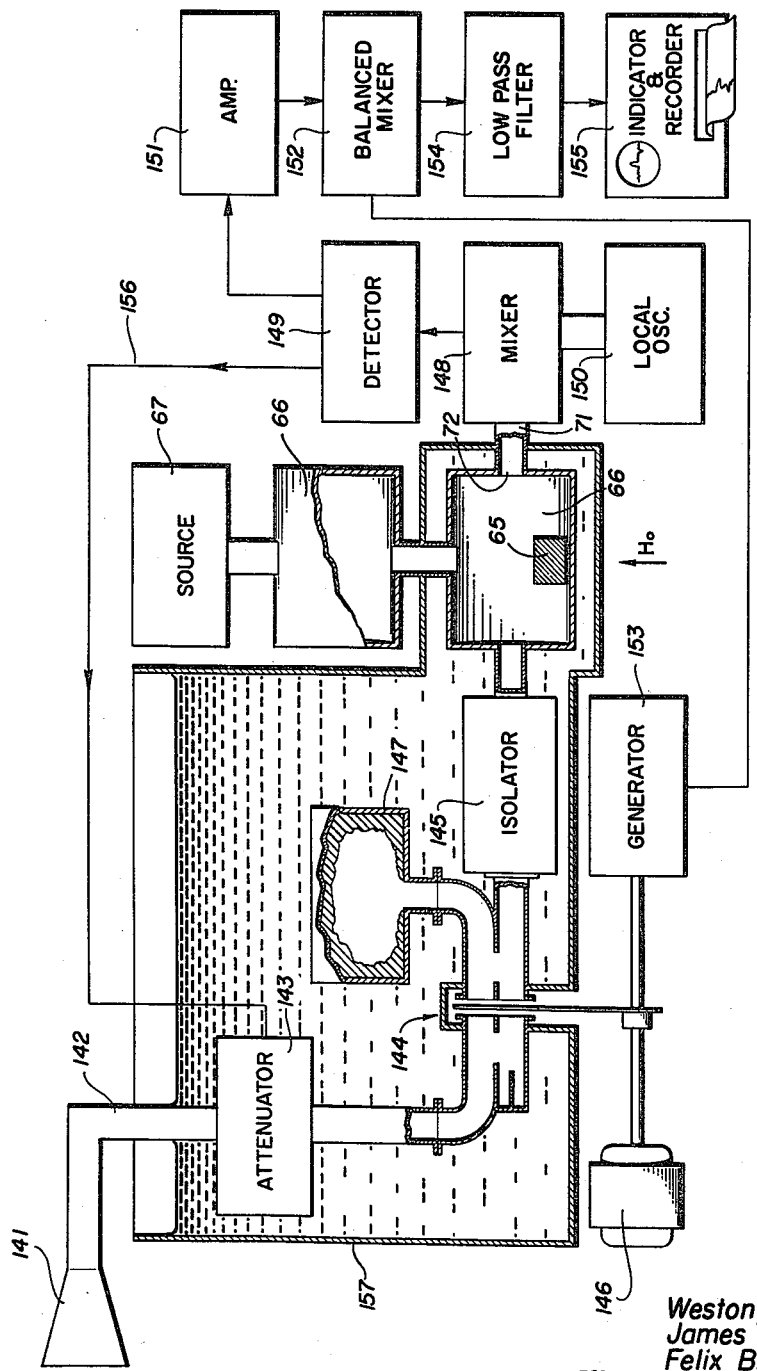

These and other features and advantages of the present invention will become apparent after a perusal of the specification taken in connection with the accompanying drawings wherein, FIG. 1 is a schematic drawing of a novel apparatus of the present invention, FIG. 2 is a schematic vector diagram depicting the classical mechanism for raising an ensemble of gyromagnetic bodies from a lower to a higher energy state, FIG. 3 is a schematic drawing, in the time domain, indicating the sequencing functions of the apparatus of FIGS. 1 and 4, FIG. 4 is a schematic drawing of a novel apparatus of the present invention, FIG. 5 is a schematic drawing of a novel apparatus of the present invention, FIG. 6 is a schematic drawing, in the time domain, depicting the sequencing function of the apparatus of FIG. 5, FIG. 7 is a schematic drawing of a novel apparatus of the present invention, FIG. 8 is a schematic drawing, in the time domain, indicating the proper sequencing function of the apparatus of FIG. 7, FIG. 9 is a schematic time sequence of vector diagrams depicting the classical method of explaining the mechanism of raising a gyromagnetic ensemble to a higher energy state, FIG. 10 is a schematic drawing of a novel apparatus of the present invention, FIG. 11 is a schematic drawing of a novel apparatus of the present invention, FIG. 12 is a schematic drawing of a novel apparatus of the present invention, FIG. 13 is a schematic drawing of a novel apparatus of the present invention, FIG. 14 is a schematic drawing of a novel apparatus of the present invention, FIG. 15 is a schematic drawing of a novel apparatus of the present invention, FIG. 16 is a schematic vector diagram sequence depicting the classical explanation of a method for raising an ensemble of gyromagnetic bodies to a higher energy state, FIG. 17 is a schematic drawing of a novel apparatus of the present invention, FIG. 18 is a schematic drawing of a novel apparatus of the present invention, FIG. 19 is a schematic drawing of a novel apparatus of the present invention, FIG. 20 is a schematic drawing of a novel alternative apparatus for replacing a portion of the structure of FIG. 19, delineated by line 20—20 of FIG. 19, FIG. 21 is a schematic drawing of a novel apparatus of the present invention, FIG. 22 is a schematic drawing of a novel apparatus of the present invention, FIG. 23 is a schematic drawing of a novel apparatus of the present invention, FIG. 24 is a schematic drawing of a novel apparatus, partly in section, of the present invention, and FIG. 25 is a schematic drawing of a novel apparatus, partly in section, of the present invention.

The method and apparatus of the present invention will now be described. Several specific embodiments of the present invention are shown in the accompanying drawings. The structure of each embodiment will be described followed immediately by a description of its specific mode of operation.

Referring now to FIG. 1 there is shown an embodiment of the present invention. A sample of matter 1 containing an ensemble of gyromagnetic bodies such as for example, the protons in water is placed within a suitable nonmagnetic container 2 and immersed in a polarizing magnetic field $H_0$. A tuned resonant circuit comprising a detector coil 3 and a shunting capacitor 4 is closely coupled to the gyromagnetic ensemble. One end of the tuned resonant circuit is connected to one terminal 5 of a suitable switch 6.

A sequencer 7 serves to energize the switch 6 through the intermediary of an electromagnetic relay 8. The switch 6 is provided with at least two positions. One position is represented by terminal 9 which is connected via lead 11 to an R.F. source 12. The other position of the switch 6 is represented by terminal 13 which is connected via lead 14 to terminals 15 and 16.

In operation, after the ensemble of gyromagnetic bodies has been immersed in the polarizing field for a certain period of time, on the order of the thermal or longitudinal relaxation time of the gyromagnetic ensemble, said ensemble will reach a state of thermal equilibrium.

The mechanism involved for the transfer of energy from the gyromagnetic ensemble to the tuned circuit can be described in general by two well-known schools of though. One school of thought is the quantum-mechanical approach and in most instances provides a more precise theory of operation, however, this more rigorous approach is often times more difficult to comprehend than the other or classical approach. The classical description is often times more easily comprehended and will be used henceforth in the following description except where the quatum-mechanical description is necessary for clarity or correctness. However, it should be borne in mind that the mechanisms involved in obtaining coherent radiation from gyromagnetic ensembles can be described by the two methods.

In a given ensemble of gyromagnetic bodies each member body has associated with it a certain angular momentum or spin and a certain magnetic moment. Thus, the individual gyromagnetic bodies can be thought of as very minute microscopic spinning magnets. In the absence of a polarizing magnetic field and for an ensemble in a state of thermal equilibrium the individual minute microscopic magnets, or gyromagnetic bodies are randomly distributed and are experiencing random vibrations due to thermal agitation. The result is that there are as many of the microscopic magnets pointing in one direction as in an exactly opposite direction at any given instant of time whereby the total magnetic moment or the vector summation of all the microscopic magnetic moments is substantially zero, on an average.

However, when such an ensemble of gyromagnetic bodies is immersed in a polarizing magnetic field it will be found that a preponderance of the minute microscopic magnets will line up in the polarizing magnetic field in one direction as opposed to the opposite direction thereby creating a total magnetic moment $M_0$ for the total ensemble. This total magnetic moment $M_0$ can be thought of as precessing, i.e., spinning about the total magnetic field $H_0$ over the sample volume.

Referring now to FIG. 2 there is shown a schematic vector diagram depicting the classical model for a given gyromagnetic ensemble. After the gyromagnetic bodies forming the ensemble have been immersed in the polarizing field for the period of time approximately equal to the thermal relaxation time of the ensemble the magnetic moment $M_0$ will be in substantial alignment with the polarizing magnetic field $H_0$ and this is depicted as position A enclosed by the bracket of FIG. 2. This state of the gyromagnetic ensemble model is known as the lowest energy state or ground state and corresponds to thermal equilibrium.

The classical model of the gyromagnetic ensemble is placed in a higher energy state by producing an angular displacement between the magnetic moment $M_0$ and the polarizing magnetic field vector $H_0$. The highest energy state obtainable occurs when the angle is approximately 180° or $\pi$ radians. This highest energy state is represented by the dotted $M_0$ vector of FIG. 2 and is enclosed by the bracket B.

Although several methods will hereinafter be described for placing the gyromagnetic ensemble in the higher energy state the one shown in FIG. 1 will now be described.

A time varying magnetic field $H_1$ is applied to the gyromagnetic ensemble at an angle of approximately 90° with respect to the direction of the polarizing magnetic field $H_0$. A rotating magnetic field $H_1$ is thereby produced which is directed approximately at right angles to the polarizing magnetic field $H_0$ and rotates about the polarizing magnetic field at an angular velocity corresponding to the frequency of the applied time varying magnetic field $H_1$. When the frequency of the applied magnetic field $H_1$ is at or near the Larmor or gyromagnetic resonance frequency of the ensemble both the applied magnetic field $H_1$ and the magnetic moment $M_0$ are rotating at substantially the same angular velocity about the polarizing magnetic field $H_0$.

A rotating set of co-ordinates has been adopted for FIG. 2 such that the model appears as it would if the observer were traveling in an orbit around and at right angles to the polarizing magnetic field vector $H_0$ and at an angular velocity corresponding to the frequency of the applied alternating magnetic field $H_1$ which is at the Larmor frequency.

In the rotating co-ordinate system when the time varying magnetic field $H_1$ is applied to the ensemble the polarizing magnetic field vector $H_0$ is lessened in magnitude by the factor $\omega_1/\gamma$ where $\omega_1$ is the frequency of the applied time varying magnetic field $H_1$ and $\gamma$ is the gyromagnetic ratio. It therefore follows that when the frequency $\omega_1$ of the applied field equals the Larmor frequency of the ensemble $\omega_1/\gamma$ equals $H_0$ and the effective polarizing field $H_{0\,\text{eff}}$ is of 0 magnitude. This leaves only the applied magnetic field $H_1$, which in the rotating set of coordinates appears as a unidirectional magnetic field at right angles to the direction of $H_0$ and of magnitude $H_1$.

In such a case, the total magnetic moment $M_0$ of the sample then sees the applied alternating magnetic field $H_1$ as the only polarizing field and begins to precess about $H_1$ at a new Larmor frequency corresponding to the magnetic field intensity $H_1$. The new Larmor frequency $\omega_2$ is expressed mathematically as $\omega_2 = \gamma H_1$.

To place the ensemble in the highest energy state it is necessary to produce 180° of angular displacement between $H_0$ and $M_0$. The length of time $H_1$ is applied is adjusted to produce just the required 180° precession of $M_0$ thereby placing the ensemble in higher or nonequilibrium energy state. The correct duration $\tau$ of the pulse is defined mathematically as $\tau = \pi/\gamma H_1$. The time varying field $H_1$ could be applied to the sample for a different period of time to produce other nonequilibrium energy states, as desired.

Thus the sequencer 7 actuates relay 8 to connect the time varying source 12 to the tuned circuit. The time varying source 12 supplies a pulse of time varying magnetic field $H_1$ at the Larmor frequency to the gyromagnetic ensemble at substantially right angles to the polarizing magnetic field $H_0$.

After the time varying field $H_1$ has been applied to the gyromagnetic ensemble for the period $\tau$ the gyromagnetic ensemble is raised to the higher energy state. Then the time varying source 12 is disconnected by energization of the relay 8 actuated by sequencer 7 and the tuned circuit is then connected to the input and output terminals 15 and 16.

At this instant of time, depending upon how tightly the tuned resonant circuit is coupled to the gyromagnetic ensemble said ensemble may serve as an amplifier of applied signals at or near the Larmor frequency or as a regenerative oscillator, oscillating at the Larmor frequency of the ensemble determined by the polarizing magnetic field $H_0$.

The coupling conditions for regenerative oscillation will now be prescribed. In general terms, the coupling between the tuned circuit and the gyromagnetic ensemble must be sufficiently great such that random spontaneous transitions of the individual gyromagnetic bodies from the higher to the lower energy state will induce a current of sufficient magnitude in the tuned circuit to further stimulate coherent emission of other gyromagnetic bodies making up the ensemble. In this manner the gyromagnetic ensemble is stimulated to coherently and regeneratively give up its energy to the tuned circuit. Without this degree of close coupling between the tuned circuit and the ensemble the individual bodies would not precess coherently about the polarizing magnetic field $H_0$ in the absence of an externally applied field at the Larmor frequency, but would instead precess at the Larmor frequency in an out-of-phase relationship thereby giving up their energy to the surrounding sample. The coupling conditions necessary for regenerative oscillation are expressed mathematically by the following inequality:

$$T_2 > + \frac{1}{2\pi |\gamma| Q \eta M_0}$$

The stimulated regenerative oscillations just described are not to be confused with the signals induced by a precessing magnetic moment $M_0$ in a detector coil not meeting the coupling requisites prescribed for regenerative oscillation or amplification. Although by application of an external time varying magnetic field at the Larmor frequency to such an ensemble, coherent precession will be obtained and a signal detected in the detector coil the power contained in the detected signal will be less than that of the applied signal necessary to produce the precession. For the cases in the prior art where the ensemble was placed in a nonequilibrium energy state and allowed to radiate without the application of a forcing signal the detected signal in the coupled circuit decays exponentially rather than building up in a regenerative manner as in the instant invention.

By inspection of the above mathematical relationship it can be seen that there are several factors that must be properly determined in order for the apparatus to operate as a regenerative oscillator. An example will now be given to indicate the oscillator embodiment. Let the polarizing magnetic field $H_0$ equal 10,000 gauss, the tuned circuit have a Q of approximately 100. $M_0$ for water is approximately equal to $3 \times 10^{-6}$ gauss. Filling factors of approximately ⅓ are easily realized by filling substantially the interior of the detecting coil 3 with sample. The gyromagnetic ratio for protons is approximately equal to $2.4 \times 10^4$ (c.g.s. units). The transverse relaxation time $T_2$ depends upon the homogeneity of the magnetic field $H_0$ but for protons of water at room temperature $T_2$ of ½ second is realistic. Substituting these values for the various variables into the above relationship we find that $T_2$ is approximately 15 times greater than the right hand side of the expression thereby easily fulfilling the requirements for regenerative oscillation. The frequency of the oscillator will be equal to the Larmor frequency of protons in a 10,000 gauss field or approximately 40 megacycles/sec. The frequency of the oscillator may be varied by varying the total magnitude of the polarizing field $H_0$.

For amplification purposes the coupling between the ensemble of gyromagnetic bodies and the tuned circuit should not be as great as that required for regenerative oscillation, since spontaneous transition should not stimulate regenerative coherent transitions. It is desired to adjust the coupling of the tuned circuit to the ensemble such that it falls just short of that degree of coupling which is required for spontaneous oscillation. However the degree of coupling should be sufficiently great such that an applied signal at or near the Larmor frequency will stimulate additional coherent transitions and thereby produce amplification.

Mathematically the coupling conditions necessary for amplification can be expressed substantially by the following approximate equality:

$$T_2 \cong + \frac{1}{2\pi |\gamma| Q \eta M_0}$$

Referring now to FIG. 3 there is shown a sequence diagram in the time domain indicating the sequence of functions of the apparatus of FIG. 1. After the sequencer 7 has energized the relay 8 to connect the input and output terminals 15 and 16 to the gyromagnetic ensemble the ensemble is now in a state which has a certain lifetime. During this lifetime the state may be spontaneously stimulated to serve as a regenerative oscillator or stimulated by application of a signal at or near the Larmor frequency to obtain amplification, as explained above.

The mechanisms involved in determining the lifetime of the nonequilibrium energy state can be easily visualized by reference to the ensemble model of FIG. 2. After the nonequilibrium energy state has been established the total magnetic moment $M_0$ begins to come back into alignment with the polarizing field $H_0$ with a time constant $T_1$.

Since the detector coil 3 is positioned with its axis at approximately right angles to the polarizing magnetic field $H_0$ the strength of the signal induced in the detector coil will be substantially equal to the sine of the angle that the vector $M_0$ makes with the polarizing magnetic field $H_0$. This being the case the signal induced in the detector coil starts out at a minimum value and builds up to a maximum, when the vector $M_0$ is substantially at right angles to $H_0$, and then decreases to substantially 0 at the point where $M_0$ is in alignment with $H_0$.

Phase coherence of the precession of the microscopic gyromagnetic bodies is a function of the homogeneity of the polarizing magnetic field $H_0$ and since it is difficult in practice to realize an extremely homogeneous magnetic field $H_0$ over the entire sample volume the microscopic magnetic moments begin to lose phase coherence resulting in a shrinking of the total magnetic moment $M_0$ of the sample. This shrinking of the total magnetic moment $M_0$ further serves to decrease the amplitude of the detected signal. This loss of phase coherence effect, in a practical way, then, decreases the useful lifetime of the non-equilibrium state. This shorter useful lifetime for the non-equilibrium energy state is denoted as $T_2$, the transverse relaxation time.

Delay periods of different duration are introduced into the operating cycle of both the amplifier and oscillator embodiments of the present invention. During these delay periods the gyromagnetic ensemble is not useful for amplification or oscillation purposes as the case may be. The delay period in each instance is approximately equal to the time difference between the theoretical lifetime $T_1$ and the time during which the ensemble may be utilized for amplification or oscillation purposes as the case may be. It is necessary to have this delay period since it is desirable to have the microscopic magnetic moments in alignment with the polarizing magnetic field $H_0$ before the pulse of time varying field $H_1$ is applied to the ensemble to raise it to the nonequilibrium energy state.

The useful lifetime of the gyromagnetic ensemble when utilized for amplification purposes is approximately equal to the time it takes the total magnetic moment $M_0$ to precess to the 90° position. Stated another way, it is the time during which the vector $M_0$ has a projection opposed to the polarizing magnetic field $H_0$. The useful lifetime of the gyromagnetic ensemble for amplification purposes is thus defined, since amplification can only take place when $M_0$ has a projection opposed to the magnetic field $H_0$.

The useful lifetime of the gyromagnetic ensemble for oscillation purposes is approximately equal to $T_2$ the transverse relaxation time.

The delay period is shown in the time sequence diagram of FIG. 3. After the delay period the sequencer switches in the time varying source 12 and thereby raises the gyromagnetic ensemble to the nonequilibrium energy state and the system has thereby completed the cycle.

The amplifier embodiment of FIG. 1 is unique in that the input and output terminals are electrically the same terminal. This is a characteristic of maser type amplifiers and the diagram of FIG. 1 has shown two terminals, an input terminal 15 and an output terminal 16 for ease of explanation only. To use the apparatus of FIG. 1 for oscillation purposes the load need only be connected to the output terminal 16.

Referring now to FIG. 4 there is shown a different version of the apparatus depicted in FIG. 1. In the apparatus as shown in FIG. 1 the tuned resonant circuit serves a threefold function; namely, to apply the 180° pulse of time varying field for raising the energy state of the gyromagnetic ensemble, to stimulate coherent emission from the ensemble, and to extract coherent emission from the ensemble for use in a load. When the various sources and loads are connected directly to the tuned circuit it becomes a rather difficult problem to provide maximum power transfer between the various sources and loads due to the impedance mismatch between the tuned circuit and the impedance of the load or sources.

Maximum power transfer between the various sources and loads is facilitated in the apparatus of FIG. 4 by providing separate coupling between the various sources or loads and the tuned circuit or the ensemble. For example, in the particular case shown in FIG. 4 the time varying source 12 is coupled to the tuned circuit via a separate inductive coil 17. The input circuit is coupled to the tuned circuit via an inductive coil 18 and the output circuit or the load is coupled to the tuned circuit via an inductive coil 19. The turns of the coil 19 may be adjusted to provide an impedance match to the load. In another embodiment of the feature described in FIG. 4 it may be desired to decouple the source from all circuits excepting the ensemble. The only requirement is that one tuned circuit be tightly coupled to the ensemble.

In operation, the apparatus of FIG. 4 operates substantially the same as the apparatus of FIG. 1 and the separate functions thereof are shown in FIG. 3. After the sample 1 has been immersed in a polarizing magnetic field $H_0$ for a time sufficient for the total magnetic moment $M_0$ of the gyromagnetic ensemble to become aligned in the polarizing magnetic field $H_0$ the sequencer 7 turn on the R.F. source 12 for a period of time sufficient to raise the ensemble to the nonequilibrium energy state. At this point the R.F. source 12 is turned off by the sequencer 7 and the period follows wherein the device may serve as an amplifier or oscillator depending upon how tightly the tuned circuit is coupled to the gyromagnetic ensemble.

Due to the phase incoherence of the microscopic gyromagnetic bodies there follows a delay period wherein the signals are too small to detect that the total magnetic moment $M_0$ has not become aligned with the polarizing magnetic field $H_0$. When the total magnetic moment $M_0$ does become aligned with the polarizing magnetic field $H_0$ the sequencer 7 again turns on the R.F. source 12 and raises the ensemble of gyromagnetic bodies to the higher energy state and the system is now in readiness for another cycle.

Referring now to FIG. 5 there is shown another embodiment of the present invention wherein the undesired delay period in the cycle of operation of the apparatus of FIG. 1 and FIG. 4 may be eliminated. In particular, at least two samples of matter 21 and 22 each containing an ensemble of gyromagnetic bodies are immersed in separate polarizing magnetic field regions. Two tuned circuits substantially identical to the tuned circuits described in FIG. 1 and FIG. 4 are provided.

Each of the tuned circuits is tightly coupled to one of the gyromagnetic samples. The tuned circuits thus provided are then connected via leads 23 and 24 to switches 25 and 26. Each switch has at least three positions and are each actuated via two electromagnetic relays 27 and 28. Electromagnetic relays 27 and 28 are motivated by impulses derived from a sequencer 29 and carried over leads 31 and 32. An R.F. source 33 is connected to positions 34 and 35 of the switches 25 and 26 respectively. Positions 36 and 37 of the switches 25 and 26 are connected to a common input-output terminal 38.

In operation sequencer 29 energizes first relay 27 to thereby actuate switch 25 and connect the R.F. source 33 to the first tuned circuit. The R.F. source 33 supplies a time varying magnetic field $H_1$ at the Larmor frequency of the gyromagnetic ensemble to the tuned circuit and is left on for a period sufficient to bring the gyromagnetic ensemble contained within sample 21 to the higher energy state. After the ensemble of the first sample of matter 21 has been raised to the higher energy state the sequencer 29 again operates the switch 25 and connects the ensemble to terminal 38 and the load. The first ensemble of gyromagnetic bodies may now be utilized for a certain period of time for amplification or oscillation depending upon how tightly the first tuned circuit is coupled to the gyromagnetic ensemble.

During the useful lifetime of the first ensemble of gyromagnetic bodies the sequencer 29 energizes the second relay 28 to connect the second tuned circuit to the R.F. source 33. The time varying magnetic field $H_1$ at the Larmor frequency of the second ensemble of gyromagnetic bodies is applied to the second sample 22 for a period of time sufficient to raise the second ensemble to the higher energy level. When the higher energy level has been reached in the second ensemble the sequencer energizes the second relay 28 to connect the second tuned circuit to the load.

In addition and simultaneously therewith the sequence 29 operates the first relay 27 to disconnect the first tuned circuit from the load. After a short delay period allowing the total magnetic moment $M_0$ of the first ensemble to come in substantial alignment with the polarizing magnetic field $H_0$ the sequencer 29 again energizes the first relay 27 to connect the R.F. source 33 to the first tuned circuit to thereby raise said first ensemble to the higher energy level. When the first ensemble has been raised to the higher energy level the sequencer 29 actuates the first relay 27 to connect the first tuned circuit to the load. Simultaneously therewith the sequencer 29 actuates the second relay 28 to disconnect the second tuned circuit from the load and a new cycle is thereby initiated.

By reference to FIG. 6 which is the functional diagram for the apparatus of FIG. 5 in the time domain it can be seen that the apparatus of FIG. 5 provides a means for obtaining continuous amplification or oscillation via stimulated emission of radiation from the gyromagnetic ensembles.

Although the apparatus of FIG. 5 has been described for clarity purposes utilizing the apparatus of FIG. 1, the apparatus of FIG. 4 which allows enhanced impedance matching may be substituted therefor with suitable modification.

Referring now to FIG. 7 there is shown another embodiment of the present invention. In this embodiment a sample of matter 39 containing an ensemble of gyromagnetic bodies is immersed in a polarizing magnetic field $H_0$ produced by solenoid 41. A tuned circuit, as shown in FIG. 1, is tightly coupled to the gyromagnetic ensemble contained within the sample 39. Two terminals 42 and 43 are provided for the solenoid 41 and are connectable to a D.C. power supply 44 via a polarity reversing switch 45. The reversing switch 45 is actuated by relay 46 which in turn is motivated by impulses received via lead 47 from the sequencer 48. Upon actuation of the reversing switch 45 the D.C. current derived from the D.C. power supply 44 is reversed through the solenoid 41 thereby reversing the magnetic field $H_0$ in which the gyromagnetic ensemble is immersed.

In operation, see FIGS. 7, 8 and 9, the magnetic field $H_0$ produced by a solenoid 41 is first created in one direction. After a certain length of time the gyromagnetic ensemble reaches a condition of thermal equilibrium. The classical model for the state of thremal equilibrium is depicted in FIG. 9(a) wherein the magnetic moment $M_0$ of the ensemble is substantially in alignment with the polarizing magnetic field $H_0$. When thermal equilibrium has been reached the sequencer 48 actuates relay 46 which in turn changes the position of reversing switch 45. This rapidly reverses the polarity of the current through the solenoid 41 and thereby reverses the polarity of the polarizing magnetic field $H_0$.

When the polarizing magnetic field $H_0$ is rapidly reversed the total magnetic moment $M_0$ of the gyromagnetic ensemble does not immediately follow the rapidly changing $H_0$ vector. Instead, immediately after the field has been reversed the magnetic moment $M_0$ is pointing in an opposite direction to the polarizing magnetic field $H_0$ in which the gyromagnetic ensemble is then immersed. In this manner the gyromagnetic ensemble is placed in the nonequilibrium or higher energy state. The nonequilibrium energy state is depicted in the vector model 9(b). As was described with relation to the previous FIGS. 1 and 4, this nonequilibrium energy state has a certain lifetime for amplification or oscillation purposes, as desired, depending upon how tightly the tuned circuit is coupled to the gyromagnetic ensemble.

A delay period during which the gyromagnetic ensemble may not be practically useful for amplification or oscillation is encountered with the apparatus of FIG. 7 as was found with the apparatus described in FIGS. 1 and 4. However, after this slight delay period has passed the magnetic field is reversed by energization of the reversing switch 45 and the gyromagnetic ensemble is thereby raised to the higher energy state and a new cycle is initiated.

A plurality of units similar to the apparatus of FIG. 7 may be utilized in the manner shown and described in relation to FIG. 5 to obviate the delay period and thereby provide an apparatus having a continuous mode of operation. The tuned circuit may be coupled to directly, as shown in FIG. 7, via lead 49 and terminal 51 or electromagnetically as shown and described with relation to FIG. 4, as desired.

Referring now to FIG. 10 there is shown another embodiment of the present invention. This embodiment has the advantage over the previously described embodiments of providing continuous amplification or oscillation, as desired, from a single sample of matter. More specifically, the mechanism for raising the amplifying or oscillating ensemble is a continuous one operating simultaneously with the mechanism for obtaining oscillation or amplification.

A sample of matter 52 which contains a first and second ensemble of gyromagnetic bodies such as, for example, nuclei and electrons is disposed in a suitable container and immersed in a polarizing magnetic field $H_0$. A tuned resonant circuit having at least two resonant modes is provided by two coupled tuned circuits. The first tuned circuit comprises coil 53 and a first capacitor 54, parallel connected. The second tuned circuit includes coil 50 and capacitor 55 parallel connected. The tuned circuits are coupled together via capacitor 60. The coil 53 is wound around the sample of matter 52 and is inductively coupled to the first and second gyromagnetic ensembles. The frequency of one of the resonant modes of the tuned circuit is at the Larmor frequency of the first ensemble of gyromagnetic bodies. The second resonant mode of the tuned circuit is resonant at the Larmor frequency of the second ensemble of gyromagnetic bodies. The first resonant mode of the tuned circuit is closely coupled to the first gyromagnetic ensemble. An R.F. source 12 is coupled to the tuned resonant circuit and provides a time varying magnetic field $H_1$ at the Larmor frequency of the second ensemble of gyromagnetic bodies.

In operation, the source 12 is energized and the signals derived therefrom applied to the second ensemble of gyromagnetic bodies. The time varying magnetic field $H_1$ derived from the source 12 is at substantially the Larmor frequency of the second ensemble of gyromagnetic bodies to produce resonance thereof. In a preferred embodiment the amplitude of the time varying magnetic field $H_1$ is made sufficient to produce at least partial saturated resonance of the second gyromagnetic ensemble. Due to the characteristics of the sample material the first and second ensembles are electromagnetically coupled to each other in such a manner that partial saturated resonance of the second ensemble produces a negative polarization of the first ensemble thereby raising the first ensemble to a nonequilibrium energy state.

The first ensemble in the nonequilibrium energy state may then be simultaneously used for continuous amplification or oscillation depending upon how tightly the first resonant mode of the tuned circuit is coupled to the first ensemble of gyromagnetic bodies as hereinbefore described.

A typical sample of matter which contains the two ensembles of gyromagnetic bodies properly inter-related such that resonance of the second ensemble raises the first ensemble to the nonequilibrium energy state is arsenic doped silicon containing $1.3 \times 10^{17}$ arsenic atoms per cubic centimeter of silicon. In this case, the second ensemble of gyromagnetic bodies comprises the unbound electrons in the outer orbit of the donor arsenic atoms. When these unbound electrons are placed in a condition of resonance the electromagnetic coupling between the electrons and the nuclei of the donor atoms raises the arsenic nuclei to the higher energy state.

The type of coupling between the electrons in the outer orbit and the nuclei for the arsenic doped silicon sample is best described by quantum-mechanical theories and is known as an I·S coupling.

Many of the typical samples which have two interacting ensembles, as just described, turn out to be solid materials as opposed to liquids and gasses. In solid samples the small interatomic distances and accompanying thermal agitation, at room temperature, work together to destroy the desired interaction between the first and second ensembles. However, this deleterious effect can in most instances be obviated by lowering the temperature of the sample to the required degree, which may in some instances be liquid helium temperatures or about 2° Kelvin. Techniques for lowering the temperature of materials are deemed well-known in the art and have therefore not been shown.

A plurality of circuits magnetically coupled to the ensembles may be utilized to perform the various functions performed by the single tuned circuit of FIG. 10. The separation of functions by the provision of separate circuits was demonstrated in FIG. 4 and may be used for impedance matching purposes, as desired.

Referring now to FIG. 11 there is shown another embodiment of the present invention. In this embodiment the principle of operation is substantially identical to that of the apparatus depicted in FIG. 10 with the exception that this embodiment is provided to cover the situation wherein the gyromagnetic resonance frequency of the second ensemble is at a microwave frequency and thus too high a frequency to utilize lower frequency circuit techniques employing lumped elements. While the resonant frequency of the second ensemble may be at microwave frequencies the resonant frequency of the first ensemble may turn out to be too low to utilize reasonably sized distributed constant circuits, i.e., waveguides and cavity resonators. In such a case the apparatus of FIG. 11 is useful.

A sample of matter 56 containing the first and second ensembles of gyromagnetic bodies is disposed within a hollow cylindrical dielectric container 57 immersed in a polarizing magnetic field $H_0$. The interior of the dielectric container 57 is provided with a thin coating of a conducting material such as, for example, silver, thereby forming a cavity resonator 58 at the microwave frequency.

An aperture 59 forming a coupling iris is provided in the conductive coating at one end of the dielectric container 57 to allow electromagnetic coupling to the cavity resonator 58. The cavity resonator 58 is designed to have a resonant mode at the Larmor frequency of the second ensemble and in a preferred embodiment is operated in the dominant TM mode.

A high frequency microwave source 61 such as, for example, a klystron oscillator is coupled to the cavity resonator 58 via the intermediaries of a hollow waveguide 62 and the coupling iris 59. A second tuned circuit of lumped elements comprising a coil 63 and a parallel connected capacitor 64 is closely coupled to the first ensemble disposed within the cavity resonator. The second tuned circuit is tuned to the Larmor frequency of the first ensemble of gyromagnetic bodies.

In operation, the second ensemble of gyromagnetic bodies is placed in a condition of saturated resonance by the application of high frequency energy derived from the microwave source 61 and applied via waveguide 62 and coupling iris 59 to the sample of matter 56. Due to the interaction between the first and second ensembles of gyromagnetic bodies the first ensemble is thereby placed in a nonequilibrium energy state which may be utilized for amplification or oscillation purposes depending upon how tightly the second tuned circuit is coupled to the first ensemble of gyromagnetic bodies.

The thin coating of conducting material deposited on the inside surfaces of the dielectric container 57 serves to substantially contain all the microwave energy within the volume defined thereby. This is so because of the shallow skin depth of the currents at microwave frequency. On the other hand, this conductive coating does not shield the sample from the lower frequency field of the second tuned circuit since the skin depth of currents at these frequencies is greater than the thickness of the conductive coating.

In another embodiment, not shown, the detecting coil 63 can be disposed within the cavity resonator 58 in which case the coil 63 can be so disposed that the magnetic fields of the cavity resonator are not shielded from the sample by the coil 63.

Referring now to FIG. 12 there is shown another embodiment of the present invention. This embodiment is substantially identical to that shown and described in FIG. 11 with the exception that in this embodiment the gyromagnetic resonant frequencies of both the first and second ensembles lie within the microwave range. The use of the word ensemble here is in conformity with the earlier definition of ensemble wherein a single gyromagnetic body may be a member of several ensembles, one ensemble corresponding to each allowed transition between energy levels. A sample of matter 65 containing a first and second ensemble of gyromagnetic bodies having the desired relationship therebetween is immersed in a polarizing magnetic field $H_0$. The sample of matter 65 is placed within a cavity resonator 66 having two resonant modes, one mode resonant at the resonant frequency of each of the gyromagnetic ensembles. The sample 65 should be placed within the cavity resonator 66 such that it is in a position to receive substantial magnetic coupling to both of the resonant modes. The required frequency difference in the two resonance modes of the cavity resonator device may be obtained by coupled cavity techniques as depicted in FIG. 12 wherein two cavity resonators are closely coupled together thereby providing the two resonant modes. In some cases, where a harmonic relationship exists between the resonant frequency of the first and second ensembles, a single cavity resonator may be utilized which is capable of resonating in the necessary harmonic mode. A source 67 of time varying energy at the Larmor frequency of the second ensemble of gyromagnetic bodies is coupled to the cavity resonator 66 via a waveguide 68 and coupling iris 69. Similarly the load 70 is coupled to the cavity resonator 66 via a waveguide 71 and coupling iris 72.

A typical sample of matter 65 having two ensembles resonant in the microwave range and properly related such that resonance of one ensemble raises the second ensemble to the higher energy state is magnetically dilute gadolinium ethyl sulphate having cerium as an additional impurity such that the crystal contains approximately 0.5% $Gd^{+++}$ and approximately 0.2% $Ce^{+++}$. Another sample is a single crystal of nickel fluosilicate 5% Ni, 95% $ZnSiF_6 \cdot 6H_2O$. The desired relationship between the ensembles in these particular samples is not predominately an I·S interaction. Instead it is a favorable relationship between the relaxation times between energy levels. It is found that a higher energy level has a relaxation time to a certain lower energy state considerably shorter than the relaxation time from the certain lower energy state to a still lower energy state. Thus by applying energy to the gyromagnetic bodies to raise them to the certain higher energy state thereby more heavily populating this certain lower energy state thereby more heavily populating this state and thereby putting it into a nonequilibrium state from which stimulated coherent emission of radiation may be obtained.

The apparatus of FIG. 12 may be utilized for continuous amplification of applied signals or as an oscillator at the Larmor frequency of the first ensemble of gyromagnetic bodies depending upon how tightly the first resonant mode of the cavity resonator is coupled to the first ensemble of the sample, as previously described.

The methods and apparatus of FIGS. 10, 11 and 12 provide a novel frequency converter apparatus wherein an input signal at one frequency is converted in an output signal at a second frequency. More specifically, when a signal is applied to the second ensemble at the Larmor frequency thereof it serves to raise the first ensemble to the nonequilibrium energy state. The coupling between the first resonant mode of the tuned circuit and the first ensemble is designed for spontaneous regenerative oscillation, as previously described. In this manner a signal applied to the apparatus at the Larmor frequency of the second ensemble is converted to a signal at the Larmor frequency of the first ensemble.

Referring now to FIG. 13 there is shown another embodiment of the present invention. This embodiment is designed to minimize the delay period of the operating cycle wherein the gyromagnetic ensemble may not be utilized to advantage, as encountered utilizing the apparatus of FIGS. 1 and 4. More specifically, a sample of matter 1 containing an ensemble of gyromagnetic bodies is disposed within a reservoir and column immersed in a polarizing magnetic field $H_0$. A tuned resonant circuit comprising a coil 3 and a parallel connected capacitor 4 is tightly coupled to the ensemble of gyromagnetic bodies within the column portion. A switch 72 is provided for alternately connecting an R.F. source 12 and the output-input terminals 74 of the apparatus to the tuned resonant circuit. A sequencer 75 serves to actuate the switch 73. The sequencer 75 also serves to actuate a pump 76 which operates intermittently as directed to rapidly displace the sample volume within the influence of the tuned circuit with a new sample volume.

In operation, the sequencer 75 operates switch 73 to apply a time varying magnetic field $H_1$ at the Larmor frequency of the ensemble derived from the R.F. source 12 to the gyromagnetic ensemble contained within the tuned circuit. The time varying field $H_1$ is applied for a period of time sufficient to raise the ensemble to the nonequilibrium energy state as previously described with regard to FIG. 1. The sequencer 75 then actuates switch 73 to disconnect the R.F. source 12 and connect the output-input terminals 74 to the tuned circuit. The nonequilibrium energy state of the gyromagnetic ensemble may then be utilized for amplification or oscillation purposes depending upon how tightly the tuned circuit is coupled to the gyromagnetic ensemble, as previously described.

When the nonequilibrium energy state has deteriorated to the point where the ensemble no longer produces a signal of sufficient amplitude to be useful the sequencer 75 actuates the pump 76 to thereby rapidly displace the sample of volume within the influence of the tuned circuit with a new sample volume which is already polarized and thus ready for immediate radiation to thereby be raised to the higher energy state.

The pump 76 may be of a centrifugal type wherein, on demand, additional sample is pulled from the reservoir and column to within the influence of the tuned circuit. On the other hand, the pump 76 may be of a conventional rapid displacement design such as, for example, a reciprocal type wherein a first volume is moved into the influence of the tuned circuit and then on the next actuation of the pump the pump operates in the opposite direction to replace the first volume with a second volume of sample. For the reciprocating case the reservoir and column are not required and the sample may be either solid, liquid or gaseous. When the old sample has been displaced with the new sample of matter the sequencer 75 actuates the switch 73 to apply the R.F. source 12 to the gyromagnetic ensemble thereby raising the ensemble to the higher energy state and initiating another cycle of operation.

Although the apparatus and method of FIG. 13 has been described utilizing the method and apparatus described in FIG. 1 the apparatus of FIG. 4 may be utilized to obtain improved impedance matching between the various loads and sources.

Referring now to FIG. 14 there is shown another embodiment of the present invention. A moving column of sample material 1 containing an ensemble of gyromagnetic bodies is immersed in a polarizing magnetic field $H_0$. A tuned resonant circuit comprising a coil 3 and a parallel connected capacitor 4 is closely coupled to the gyromagnetic ensemble. A second coil 77 is disposed upstream of the tuned resonant circuit and electromagnetically decoupled therefrom. The second coil 77 has its axis substantially at right angles to the polarizing magnetic field $H_0$. An R.F. source 12 serves to energize the second R.F. coil 77.

In operation, the gyromagnetic ensemble is immersed in the polarizing magnetic field $H_0$ for a period sufficient to obtain thermal equilibrium of the gyromagnetic ensemble. The ensemble then moves as by, for example, flowing into the influence of the time varying magnetic field $H_1$ applied via the second coil 77 substantially at right angles to the polarizing magnetic field $H_0$. The applied alternating magnetic field $H_1$ derived from the R.F. source 12 is substantially at the Larmor frequency of the gyromagnetic ensemble within the polarizing magnetic field $H_0$ and is of sufficient amplitude to produce a nonadiabatic 180° reversal of the magnetic moment $M_0$ of the gyromagnetic ensemble in the time required for the gyromagnetic ensemble to traverse the region of influence of the second R.F. coil 77.

In this manner the gyromagnetic ensemble is raised to the nonequilibrium energy state, as previously described with relation to FIG. 1. Both the magnitude of the applied alternating magnetic field $H_1$ and the velocity of movement of the gyromagnetic ensemble may be varied to produce the required 180° reversal of the magnetic moment $M_0$.

The gyromagnetic ensemble thus placed in the nonequilibrium energy state moves into the influence of the tuned circuit wherein the gyromagnetic ensemble may be stimulated to coherently give up its energy to the tuned circuit. Continuous amplification or continuous regenerative oscillation may be obtained depending on the degree of coupling between the tuned circuit and the ensemble, as previously described.

The velocity of the movement of the gyromagnetic ensemble from the influence of the applied time varying magnetic field $H_1$ to the tuned resonant circuit is sufficiently high such that the time required to traverse the distance between these two circuits be small compared to the thermal relaxation time $T_1$ of the gyromagnetic ensemble. This is necessary so that there will be sufficient lifetime remaining in the nonequilibrium energy state when it reaches the tuned circuit such that the ensemble can deliver energy to this tuned circuit during the time it takes the ensemble to pass therethrough.

Although a single tuned circuit has been shown in FIG. 14 the features of FIG. 4 may be utilized in the apparatus as depicted in FIG. 14 to produce enhanced impedance matching between the tuned circuit and various loads or sources.

Referring now to FIG. 15 there is shown another embodiment of the present invention. A column of sample material 1 containing an ensemble of gyromagnetic bodies is immersed in a polarizing magnetic field $H_0$. A tuned circuit comprising a coil 3 and a parallel connected capacitor 4 is tightly coupled to the gyromagnetic ensemble. The tuned circuit is tuned substantially to the Larmor frequency of the gyromagnetic ensemble.

A transmitter coil 78 is positioned upstream of the tuned resonant circuit for applying to the gyromagnetic ensemble a time varying magnetic field $H_1$ derived from the radio frequency source 12. A substantial linear gradient $$\frac{dH_0}{dz}$$

in the polarizing magnetic field $H_0$, running in the direction of flow of the gyromagnetic ensemble, is provided in the region of the transmitter coil 78. The polarizing magnetic field $H_0$ in the region of the tuned circuit is substantially homogeneous.

In operation, the sample material 1 containing the ensemble of gyromagnetic bodies is immersed in the polarizing magnetic field $H_0$ for a period sufficient to establish thermal equilibrium thereof. The ensemble then moves into the influence of the applied time varying magnetic field $H_1$ derived from the R.F. source 12. The frequency of the applied magnetic field $H_1$ is selected to be at substantially the Larmor frequency of the ensemble corresponding to the polarizing magnetic field $H_0$ in the center of the linear gradient within the influence of the transmitter coil 78.

The gyromagnetic ensemble, when in the influence of the applied time varying magnetic field $H_1$ and simultaneously exposed to the gradient $$\frac{dH_0}{dz}$$

in the polarizing magnetic field $H_0$ undergoes an adiabatic reversal thereby placing the ensemble in the higher energy state.

Upon passing out of the influence of the applied magnetic field $H_1$ the ensemble passes into the influence of the tuned resonant circuit which is tuned substantially to the resonant frequency of the gyromagnetic ensemble when immersed in the homogeneous polarizing magnetic field $H_0$ in the region of said tuned circuit. The time required for the gyromagnetic ensemble to traverse the distance between the region of influence of the applied magnetic field $H_1$ and the tuned circuit must be short compared to the thermal relaxation time $T_1$ of the gyromagnetic ensemble. This is necessary so that there will be sufficient lifetime remaining in the nonequilibrium energy state while the gyromagnetic ensemble traverses the region of the tuned circuit. The apparatus of FIG. 15 may be utilized for continuous amplification or continuous regenerative oscillation depending on how tightly the tuned circuit is coupled to the gyromagnetic ensemble, as previously described.

Referring now to FIG. 16 there is shown the classical vector model of the ensemble in the rotating system of co-ordinates describing the mechanism involved in the adiabatic reversal of the energy states as employed in the apparatus of FIG. 15. Several vector models depicting a position sequence of the gyromagnetic ensemble are presented to describe the mechanism involved as the ensemble moves through the magnetic field gradient. Vector model (a) depicts the ensemble at a position outside the influence of the applied time varying magnetic field $H_1$. Vector model (b) depicts the ensemble as it comes into the influence of the time varying magnetic field $H_1$. It will be seen that the effective polarizing field $H_0$ is reduced by an amount $H_p$. Where $$H_p = \frac{\omega_1}{\gamma}$$

and $\omega_1$ is the frequency of the applied time varying magnetic field $H_1$.

Following through the vector sequence it will be seen that for successive sites of the gyromagnetic ensemble corresponding to sites b, c, d, e and f respectively of FIG. 15, the resultant of $H_1$ and $H_0$ minus $H_p$, starts out in substantial alignment with $H_0$ and slowly advances around to a position substantially 180° out of phase with $H_0$. Since the resultant magnetic field changes slowly the magnetic moment $M_0$ of the ensemble follows the resultant and tends to remain in alignment therewith.

When the situs of the ensemble advances to a position which is just beyond the influence of the applied magnetic field $H_1$ the ensemble which has slowly changed around in phase following the resultant field will turn out to be 180° out-of-phase with the polarizing magnetic field $H_0$ and thus the ensemble will be in the higher energy state. The transition of the gyromagnetic ensemble from the lower energy state to the higher energy state in the manner just described is known as an adiabatic passage.

Referring now to FIG. 17 there is shown another embodiment of the present invention. The apparatus of FIG. 17 and the mode of operation thereof is substantially identical to that of FIG. 15 with the exception that the polarizing magnetic field $H_0$ is now specified as being produced by a magnet 79. The pole faces of the magnet are suitably shaped to produce the linear field gradient in the direction of the movement of the gyromagnetic ensemble. More specifically, the gap spacing is tapered in the direction of the motion of the gyromagnetic ensemble to thereby produce the required gradient.

Although the tapered gap has been shown as increasing the gap spacing in the direction of movement of the sample this is not a requirement and, in fact, the taper may just as well have been in the opposite direction thereby producing a decrease in the gap spacing in the direction of movement of the gyromagnetic ensemble. It will be noted that the gap spacing in the region where the tuned circuit is positioned is not tapered, thereby producing the homogeneous magnetic field required for obtaining coherent emission from the gyromagnetic ensemble.

Although FIGS. 15 and 17 are shown utilizing a single tuned resonant circuit for coupling to the gyromagnetic ensemble a plurality of coils as demonstrated with regard to FIG. 4 may be utilized for improved impedance matching, and the like. In addition, the gradient in the polarizing magnetic field may be provided by a suitable arrangement of coils carrying D.C. currents.

Referring now to FIG. 18 there is shown another embodiment of the present invention. FIG. 18 demonstrates how the apparatus of the previous embodiments may be utilized to produce an extremely low noise narrow band tunable receiver. More specifically, a sample of matter 1 containing an ensemble of gyromagnetic bodies is immersed in a polarizing magnetic field $H_0$ produced, for example, by a magnet 81. The gyromagnetic ensemble is put into the nonequilibrium energy state; for example, by the method and apparatus as shown and described in FIG. 14. The gyromagnetic ensemble in the nonequilibrium state then passes into the region of influence of a tuned resonant circuit as described in FIG. 1.

An antenna 82 receives an incoming signal and transmits it via lead 83 to a second transmitter coil 84 electromagnetically coupled to the gyromagnetic ensemble in the region of the tuned circuit. The degree of coupling between the gyromagnetic ensemble and the tuned circuit is designed such that the apparatus operates as an amplifier, as previously described.

Signals applied via the second transmitter coil 84 when substantially at the Larmor frequency of the gyromagnetic ensemble serve to stimulate coherent transitions of the gyromagnetic ensemble. Amplified signals are thereby induced in the tuned circuit. These signals are fed to an amplifier 85 wherein they are amplified and fed to a detector 86. The detector 86 derives a D.C. signal proportional to the incoming signal received in the antenna 82. The detected D.C. signal is then fed to a recorder 87 or an oscilloscope or other display means, as desired.

The frequency of the receiver may be varied by changing the value of the polarizing magnetic field $H_0$ applied to the gyromagnetic ensemble. A D.C. bias coil 88 is provided for this purpose and is supplied with the proper D.C. currents from a tuner unit 89 to thereby produce a field which adds to or subtracts from the total magnetic polarizing field $H_0$ thereby serving to tune the receiver.

Referring now to FIG. 19 there is shown another embodiment of the present invention. In this embodiment an extremely high resolution gyromagnetic resonance spectrometer is provided. The sample of matter 91 which is under investigation and which may contain one or more ensembles of gyromagnetic bodies is immersed within a polarizing magnetic field $H_0$ such as, for example, that produced by a magnet 92. A high Q tuned resonant circuit comprising an inductive coil 93 and a shunting capacitor 94 is coupled to the sample of matter 91 under investigation. An R.F. transmitter coil 95 is disposed adjacent to the sample of matter under investigation and has its axis disposed at substantially right angles to the polarizing magnetic field $H_0$ and the axis of coil 93. An R.F. source 96 is provided to drive the transmitter coil 95. A field sweep coil 97 is disposed straddling the sample of matter 91 under investigation and is energized by a sweep generator 98 to thereby vary the total magnetic field $H_0$ applied to the sample of matter 91 under investigation, as desired.

A gyromagnetic amplifier, as previously described in FIG. 17, is provided for amplifying signals derived from the sample of matter 91 under investigation. The input circuit to the gyomagnetic amplifier comprises a second transmitter coil 99 coupled to the tuned circuit, said tuned circuit being coupled to the sample 91 under analysis. The output from the gyromagnetic amplifier is applied to a standard amplifier 101 and amplified therein. The field sweep coil 97 is spacially displaced from the gyromagnetic amplifier such that changes in the polarizing field $H_0$ produced by the coil 97 are not applied to the gyromagnetic amplifier. The amplified signal is then fed to a detector 102 wherein the signals are transformed into variable D.C. signals indicative of resonance, if any. The detected signal is then fed to an indicator and recorder 103 wherein it is indicated and recorded, as desired.

An electromagnetic shield 104 as of, for example, copper is disposed between the sample of matter 91 under investigation and the gyromagnetic ensemble utilized for amplification such that unwanted coupling of energy from the first R.F. transmitter coil 95 to the input transmitter coil 99 of the gyromagnetic amplifier may be eliminated.

In operation, a time varying magnetic field $H_1$ at a certain fixed frequency near the Larmor frequency of the sample of matter 91 under investigation is supplied by the R.F. source 96 and applied via transmitter coil 95 to the sample of matter 91 under investigation. A polarizing magnetic field $H_0$ applied to the sample of matter under investigation is varied in intensity by the sweep generator 98 and sweep coils 97 until the total magnetic field $H_0$ applied to the sample under investigation corresponds to that intensity which is necessary for gyromagnetic resonance of a gyromagnetic ensemble, if any, contained within the sample under investigation. At resonance of the gyromagnetic ensemble contained within the sample 91 a signal will be induced in the tuned circuit and applied to the transmitter coil 99 of the gyromagnetic amplifier.

The gyromagnetic amplifier will amplify the resonance signals obtained from the sample 91 under investigation. These amplified resonance signals are then fed to an amplifier 101 wherein the signals are further amplified, thence to detector 102. The detected signal is then fed to an indicator and recorder 103 for displaying the resonance signal.

Use of a gyromagnetic amplifier for providing the first stage of amplification of the gyromagnetic resonance signal provides an extremely low noise method for observing the gyromagnetic resonance phenomena.

Although the apparatus and method of FIG. 19 has been described utilizing the particular gyromagnetic amplifier embodiment of FIG. 17 the amplifier embodiments of FIGS. 5, 10, 11, 12 and 14 may equally well be used. Moreover, if transient amplification is permissible for the particular application the amplifier embodiment of FIGS. 1, 4, 7 and 13 may be utilized. At microwave frequencies the microwave equivalents of the aforementioned amplifier embodiments may be utilized.

In a variation of the apparatus of FIG. 19 the R.F. source 96 may be designed to supply a relatively wide band signal thereby exciting simultaneous gyromagnetic resonance of a plurality of gyromagnetic ensembles, if any, contained within the sample of matter 91 under investigation. The gyromagnetic amplifier which is inherently a very narrow band device is then swept in frequency through the gyromagnetic resonance spectrum derived from the sample under investigation by means of the sweep generator 98 applying a variable polarizing magnetic field $H_0$ to the gyromagnetic amplifier, as shown in FIG. 18. When the gyromagnetic amplifier is operated in this manner it will successively amplify the various resonance signals obtained from the sample 91 under investigation as a function of the sweep field applied to the gyromagnetic amplifier.

Referring now to FIG. 20 there is shown another embodiment of the present invention. The gyromagnetic spectrometer method and apparatus described in regard to FIG. 19 is not limited to the so-called crossed coils method for detecting gyromagnetic resonance of the sample 91 under investigation. In particular, FIG. 20 depicts an alternative apparatus that may be substituted for a portion of the structure of FIG. 19 delineated by line 20—20 of FIG. 19. In this embodiment a bridge method is utilized for detecting gyromagnetic resonance of the sample 91 under investigation.

The sample of matter 91 under investigation is immersed in a polarizing magnetic field $H_0$. A tuned resonant circuit comprising an inductive coil 93 and a shunting capacitor 94 is coupled to the sample of matter 91. The tuned circuit forms one arm of a bridge network 105, the remaining portion of the bridge 105 being delineated by the dotted lines. The bridge network 105 is of a conventional design described in an article by Herbert L. Anderson appearing in "The Physical Review," vol. 76, p. 1460 (1949).

An R.F. source 96 supplies a fixed frequency time varying magnetic field $H_1$ to the bridge network 105. The bridge 105 is designed to be balanced in the absence of gyromagnetic resonance of a gyromagnetic ensemble contained within the sample of matter 91. Sweep coils 97 are positioned straddling the sample of matter 91 under investigation and serve when energized by sweep generator 98 to vary the total magnetic field $H_0$ applied to the gyromagnetic sample. The output of the bridge network 105 is fed to the transmitter coil 99 of the gyromagnetic amplifier via lead 100.

In operation, the R.F. source 96 supplies a fixed frequency time varying magnetic field $H_1$ to the bridge 105. The sweep generator 98 varies the total magnetic field $H_0$ applied to the gyromagnetic ensembles, if any, contained within the sample of matter 91 under investigation. When the total magnetic field $H_0$ applied to the gyromagnetic ensemble is equal to the value of the magnetic field $H_0$ required to produce gyromagnetic resonance at the frequency of the time varying magnetic field $H_1$, gyromagnetic ensemble will experience resonance thereby unbalancing the bridge network 105. When the bridge is unbalanced a signal is fed from the bridge 105 to the transmitter coil 99 of the gyromagnetic amplifier wherein it is amplified and fed successively to the amplifier 101, detector 102 and indicator and recorder 103.

Referring now to FIG. 21 there is shown another embodiment of the present invention. This embodiment provides a novel gyromagnetic resonance spectrometer system which is characterized by an extremely stable high resolution resonance spectrum obtainable therefrom.

The apparatus of the embodiment is substantially the same as the apparatus of FIG. 19 with the exception that the R.F. source 96 of FIG. 19 is replaced by a gyromagnetic oscillator of the type shown and described in FIG. 17. In particular, a second column 106 of moving sample 1 containing an ensemble of gyromagnetic bodies passes through a region wherein the ensemble is simultaneously exposed to a linear gradient of the polarizing magnetic field $H_0$ in the direction of the movement of the sample and to a time varying magnetic field $H_1$ derived from the R.F. source 12. In this manner the gyromagnetic ensemble is put into a higher energy state, as previously described.

The gyromagnetic ensemble thus placed in the non-equilibrium state passes into the region of a tightly coupled tuned circuit which is tuned to the Larmor frequency of the gyromagnetic ensemble. The tuned circuit is closely coupled to the ensemble, as previously described, to produce regenerative oscillation thereby forming a gyromagnetic regenerative oscillator. The signals thus induced in the tuned circuit of the gyromagnetic oscillator are applied to the sample of matter 91 under investigation via transmitter coil 95 to thereby produce gyromagnetic resonance of the gyromagnetic ensembles, if any, within the sample under investigation.

The novel gyromagnetic spectrometer apparatus as described herein provides an extremely stable device since the sample under investigation, the gyromagnetic oscillator, and the gyromagnetic amplifier are all disposed within the same magnetic field $H_0$ subject to substantially identical fluctuations with time whereby the deleterious effects of minute fluctuations in the total magnetic field with time are cancelled. A gyromagnetic resonance spectrometer apparatus wherein a first sample of gyromagnetic material disposed in a certain polarizing field is excited into resonance by R.F. energy having corrective fluctuations in frequency derived from a second sample disposed within the same polarizing magnetic field is claimed in a copending application U.S. 606,820, filed August 29, 1956, inventor Russell H. Varian, and assigned to Varian Associates, the assignee of the present invention.

Although the novel spectrometer embodiment of the present invention shown and described in FIG. 21 has been described utilizing the amplifier and oscillator embodiments of FIG. 17 the gyromagnetic oscillator and amplifier utilized in the apparatus of FIG. 21 may be replaced by any one of the gyromagnetic amplifiers and oscillators previously described herein. In addition, the spectrometer embodiment of FIG. 21 may be modified by deleting the gyromagnetic amplifier feature and by feeding the resonance signal detected in the tuned circuit coupled to sample 91 directly to the amplifier 101.

Referring now to FIG. 22 there is shown another embodiment of the present invention. This embodiment provides a novel data processing component wherein information in the current domain may be transformed to information in the frequency domain. The transformed information in the frequency domain may be stored in a memory and programed as necessary for later data processing.

A gyromagnetic regenerative oscillator such as previously described with relation tof FIG. 14 is immersed in a polarizing magnetic field $H_0$ as produced by magnet 107. A magnetic field bias coil 108 is provided for varying the total magnetic field intensity $H_0$ in the region of the tuned circuit of the gyromagnetic oscillator. The bias coil 108 is designed to produce a magnetic field in opposition or in addition to the total magnetic field $H_0$ in variable accordance with the current flowing through the bias coil 108. The bias magnetic field produced by the field bias coil 108 may be made a linear function of the current through the coil 108 and thus the frequency of the gyromagnetic regenerative oscillator is made a linear function of the signal in the current domain applied to the field bias coil 108. In this manner signals in the current domain are transformed into signals in the frequency domain.

The tuned circuit of the gyromagnetic oscillator is coupled to an amplifier 109 wherein the oscillatory signal is amplified. The output of the amplifier is then fed to a memory device 111 as directed by a programmer 112. When called upon by the programmer 112 the memory device 111 feeds the signal to a load 113. A current amplifier 110 may be provided for amplifying the input signal in the current domain which is fed to the field bias coil 108, if necessary.

Although a particular oscillator embodiment has been shown and described for use in FIG. 22 any of the previously described oscillator embodiments as previously described herein may be substituted therefore with suitable modification.

Referring now to FIG. 23 there is shown another embodiment of the present invention. This embodiment provides an extremely low noise radar receiver. The sample of matter 114 containing an ensemble of gyromagntic bodies is immersed in a polarizing magnetic field $H_0$ of sufficient intensity to place the Larmor frequency of the ensemble at the frequency of the radar signals. A suitable sample of matter 114, for example, is arsenic doped silicon which contains an ensemble of electrons having a suitable transverse relaxation time $T_2$.

A sequencer 115 serves to selectively energize a high frequency source 116 such as, for example, a klystron oscillator to supply a time varying magnetic field $H_1$ substantially at the Larmor frequency of the gyromagnetic ensemble. The time varying magnetic field $H_1$ is applied to a circulator 117 at terminal (a) thereof and is propagated therein to terminal (b) wherein the signal enters a waveguide 118 and is propagated therethrough to a TR tube 119. The TR tube is designed to fire upon receipt of the time varying magnetic field $H_1$ whereupon $H_1$ is reflected back via waveguide 118 to the circulator 117. The reflected $H_1$ energy enters the circulator 117 at terminal (b) and is propagated therethrough to terminal (c) whereat the $H_1$ energy leaves the circulator and is propagated via waveguide 121 to a cavity resonator 122.

The cavity resonator 122 is designed to have a resonant mode at the gyromagnetic resonance frequency of the gyromagnetic ensembled and contains therewithin the gyromagnetic ensemble. The sequencer 115 leaves the source 116 energized for a time $\tau$ sufficient to raise the ensemble to the higher energy state, as previously described with regard to FIG. 1. When the ensemble is placed in the higher energy state the sequencer 115 de-energizes the source 116 and the ensemble is now in a state of readiness to amplify signals applied thereto.

An antenna 123 receives the radar signal which it is desired to amplify and feeds this signal via waveguide 124, variable attenuator 125 and TR tube 119 to terminal (b) of the circulator 117. The radar signal enters the circulator at terminal (b) and is propagated therethrough to termnial (c) thence to the cavity resonator 122 and gyromagnetic ensemble. The radar signal stimulates coherent emission of the gyromagnetic ensemble thereby greatly amplifying the radar signal which is then fed via waveguide 121 to terminal (c) of the circulator. The amplified radar signal entering terminal (c) of the circulator 117 is propagated therethrough to terminal (d) thence via waveguide 126 and TR tube 127 to mixer 128.

Mixer 128 mixes the amplified radar signal with the signal derived from a local oscillator 129 to thereby produce a lower intermediate frequency which is fed to amplifier 131. The intermediate frequency is amplified in amplifier 131 and detected in detector 132 thence fed to range indicator 133 wherein the relative amplitude and range of the echo is indicated.

The second TR tube 127 is provided to prevent energy derived from the source 116, which is reflected from the cavity resonator 122 back into the circulator 117, from being applied to and overloading the mixer 128. The second TR tube 127 is set to fire when signals of excessive amplitude are applied thereto thereby shorting the waveguide 126 and reflecting this energy back to the circulator 117 and thence into the source 116.

Many sample materials 114 will require, for proper operation, that the sample be cooled to a temperature of a few degrees Kelvin. In such a case the cavity resonator 122 containing the sample of matter 114 is immersed in a bath of liquid nitrogen or helium, as required, which is contained within a suitable container 134.

The noise figure of a radar receiver as shown in FIG. 23 can be made extremely low offering a considerably enhanced performance over prior art radar receivers. The noise figure of the gyromagnetic amplifier including the first mixing stage of the receiver can be expressed mathematically as follows:

$$F_t = F_1 + \frac{F_2}{G}$$

where $F_t$ is the total noise figure in db of the gyromagnetic amplifier plus the mixer stage of the receiver, $F_1$ is the noise figure in db of the gyromagnetic amplifier, $F_2$ is the noise figure in db of the mixer, and $G$ is the power gain in db of the gyromagnetic amplifier. Realistic values for the noise figure of the gyromagnetic amplifier are approximately 1 to 2 db whereas similar values for the noise figure of the mixer are approximately 10 db. Reasonable gains for the gyromagnetic amplifier range from 10 to 100. Substitution of these approximate figures into the above expression show that a realistic noise figure $F_t$ for the radar receiver is approximately 1.5 to 3 db. This is considerably better than noise figures presently obtainable with conventional prior art radar receivers.

Incoming signals which are fed from the antenna to the gyromagnetic ensemble for amplification purposes should not be of an amplitude greater than that amplitude necessary to produce saturation of the gyromagnetic ensemble. Thus when the radar receiver is being utilized in a situation where it is likely to receive signals which are larger than the saturation value a variable attenuator 125 such as, for example, a ferrite amplitude modulator is provided in the input waveguide 124 and selectively controlled via a gain control signal derived from the detector 132 and applied over lead 135, to variably attenuate the input signal to keep it below the threshold saturation amplitude.

A certain degree of flexibility is provided in determining the sequencing functions of the apparatus. In certain cases it may be desirable to raise the ensemble to the higher energy state after receipt of each individual incoming echo pulse. In such a case the duration of the echo pulse should be less than the transverse relaxation time $T_2$ of the gyromagnetic ensemble such that the entire pulse may be amplified. In addition, the pulse cycle period should be greater than the longitudinal relaxation time $T_1$ of the gyromagnetic ensemble.

For the case where the gyromagnetic ensemble is raised to the higher energy state after receiving a plurality of echo pulses the difference between the longitudinal relaxation time $T_1$ and the transverse relaxation time $T_2$ should be less than the period between pulses so that the ensemble may be raised to the higher energy state between pulses without missing a pulse. Of course, if it is permissible to miss pulses then the above stated desirable requirements may be relaxed.

The radar receiver embodiment shown and described with regard to FIG. 23 is exemplary of how the gyromagnetic amplifier may be utilized for amplification of signals in the microwave frequency range, as customarily used in radar systems. However, this embodiment is not limited to use of the gyromagnetic amplifier embodiment of FIG. 1 and with suitable modification, commensurate with the higher frequencies requirements, may utilize any of the amplifier embodiments as previously shown and described.

Referring now to FIG. 24 there is shown another embodiment of the present invention. In this embodiment a radar receiver is described and shown which is similar to that shown and previously described in FIG. 23 with the exception that the present radar system provides an apparatus for obtaining continuous amplification of the incoming radar signals and utilizes the amplifier embodiment previously described in FIG. 12.

In particular, a sample of matter 65 containing at least two ensembles of gyromagnetic bodies related to each other in such a manner that partially saturated resonance of one ensemble raises the second ensemble to the higher energy state is immersed in a polarizing magnetic field $H_0$. The sample of matter 65 is disposed within a cavity resonator 66 having two resonant modes, one mode resonant at each of the Larmor frequencies of the gyromagnetic ensembles contained within the sample of matter 65.

A source 67 of time varying electromagnetic energy at the Larmor frequency of the ensemble which it is desired to partially saturate for raising the other ensemble to the higher energy state is coupled to the cavity resonator 66 via waveguide 68. An antenna 123 receives the radar echo signal and feeds it via waveguide 124, variable attenuator 125 and isolator 136 to the cavity resonator 66. The incoming microwave signals thus fed to the cavity are applied to the ensemble of gyromagnetic bodies which has been placed in the nonequilibrium energy state and coherent stimulated emission is thereby produced which serves to amplify the incoming signal. The isolator 136 is provided to prevent the amplified incoming signal from being reradiated from the antenna 123 and also serves to prevent the energy derived from source 67 from being radiated from the antenna 123.

The amplified signal is coupled out of the cavity resonator 66 via iris 72 and fed via waveguide 71 to filter 137. Filter 137 is of a suitable design to reject signals of the same frequency as source 67 but designed to pass signals of the frequency of the radar signal. The amplified radar signal then passes to mixer 128 where it is mixed with the frequency from a local oscillator 129 to produce a lower intermediate frequency which is fed to detector 132.

The detected signal is then fed to a range and azimuth indicator 133. As in the embodiment of FIG. 23 the incoming signal amplitude must be kept below the saturation amplitude sufficient to produce appreciable saturation of the gyromagnetic ensemble utilized for amplification purposes. Accordingly, an automatic gain control signal is derived from detector 132 and fed via lead 135 to the variable attenuator 125.

An extremely sensitive and stable moving target radar system may be obtained combining the teachings of the embodiments of FIGS. 21, 23 and 24. More specifically, the radar signal which is directed at the target is derived from a gyromagnetic spontaneous regenerative oscillator immersed in a polarizing magnetic field $H_0$ subject to the same minute fluctuations with time as the polarizing magnetic field $H_0$ applied to the gyromagnetic ensemble used for amplification of the echo signal. Of course the total magnetic field $H_0$ applied to amplifying ensemble will in most instances have to be variable and of different intensity than the polarizing magnetic field applied to the gyromagnetic oscillator due to the Doppler shift in frequency of the echo signal.

Referring now to FIG. 25 there is shown another embodiment of the present invention. This embodiment provides an extremely sensitive radiometer useful for radio astronomy, for determining the temperature of bodies from a remote location, determining the location of objects of differing temperature and for many other uses.

In particular, the extremely low noise amplifier feature of the present invention may be utilized for amplifying the microwave energy radiated from bodies having temperatures higher than zero degrees Kelvin. Since the gyromagnetic amplifier provides an extremely low noise figure, high sensitivity may be obtained in the measurement of the radiation emitted from a body under investigation. Accordingly, a sample of material 65 containing a plurality of ensembles of gyromagnetic bodies is suitably disposed within a cavity resonator which is comprised, for example, of two cavities closely coupled to provide the two necessary resonant modes. The cavity 66 is excited by a source 67 supplying a time varying magnetic field $H_1$ at the Larmor frequency of the second ensemble which is utilized to raise the amplifying ensemble to the higher energy state.

A suitable antenna 141 which may be, for example, of the horn type is directed at the body, the temperature of which it is desired to measure. Radiation emanating from the body is received in the antenna 141 and propagated via waveguide 142 and variable attenuator 143 to a suitable microwave switch 144. The microwave switch may be any one of various well-known fast acting switches. The present switch, as shown in the drawings, is fully described in an article appearing in the I.R.E. Transactions on Microwave Theory and Techniques, volume MTT-3, October 1955, by W. L. Teeter and entitled "A High Speed Broad Band Microwave Switch." In one position of the switch the incoming signal from the antenna 141 is fed via an isolator 145 to cavity 66 containing the gyromagnetic action medium for amplifying the signals applied thereto.

The switch 144 is driven by a motor 146 and in its other position blocks off the antenna 141 from the amplifier and in its place connects a reference resistive termination 147. The resistive termination 147 comprises a lossy material such as, for example, aquadag suitably disposed within a waveguide the impedance of which is matched to the impedance of the switch to provide maximum energy transfer between the resistive termination 147 and the switch 144.

The reference resistive termination 147 will provide a noise signal to the switch which is a function of the temperature of the resistive termination 147. In this manner a signal is derived from the body when the switch is in one position and applied to the amplifier and when the switch is in the other position a signal is derived from the reference resistor 147 and fed to the amplifier.

The noise signals applied to the gyromagnetic amplifier are amplified therein and fed to a mixer 148 wherein they are mixed with a signal derived from a local oscillator 150 to produce a band of lower intermediate frequencies.

The lower intermediate frequencies contain the random noise signals obtainable from the resistive termination 147 and the body under investigation plus a frequency component which is at the frequency of the switching action and of a magnitude proportional to the difference in the noise or temperature of the body and the resistive termination 147. The band of intermediate frequencies is fed to a detector 149 where it is detected and thence to an amplifier 151 wherein the low frequency components of the detected signal, in the order of the switching frequency, are amplified and thence fed to a balance mixer 152.

In the balanced mixer the low frequency components derived from the amplifier 151 are mixed with a similar low frequency signal obtained from a generator 153 coupled to the same shaft as the switch 144 such that a signal is derived from the generator 153 at the same frequency as the switching frequency. The output of the balance mixer 152 will contain a D.C. or extremely low frequency signal the amplitude of which is proportional to the difference between the temperature of the body and the temperature of the resistive termination 147. This low frequency signal is passed through low pass filter 154 and to the input of an indicator and recorder 155. An automatic gain control signal to prevent oversaturation of the amplifying gyromagnetic ensemble contained within the cavity resonator 66 is derived from the detector 149 and fed via lead 156 to the variable attenuator 143.

For extremely high sensitivity the variable attenuator 143, reference terminating resistor 147, isolator 145, cavity 66 and the resistive termination of the microwave switch 144 may be immersed in a bath of liquid helium or some other coolant contained within a suitable container 157. When this is done extraneously induced resistive noises are minimized.

Although a rather slow acting switch 144 has been shown and described in regard to FIG. 25 there are other faster acting switches operable at microwave frequencies which may be utilized such as, for example, two ferrite variable attenuators operated via a sequencer to obtain much faster switching rates. The apparatus of FIG. 25 moreover may be easily modified to provide an azimuth-elevation display of a certain area. This would be accomplished by scanning the antenna 141 such as, for example, in a spiral type scan and displaying the signal obtained at the indicator and recorder on an oscilloscope with a spiral type sweep in synchronism with the antenna scan. In this manner the elevation and azimuth of bodies of differing temperatures would be indicated.

Of course all of the oscillator embodiments of the present invention previously described serve to provide a frequency of oscillation which is a direct measure of the magnetic field intensity $H_0$. Accordingly they may be utilized to measure the magnetic field intensity by merely measuring the frequency of oscillation.

All of the foregoing embodiments of the present invention offer considerably more tunability than obtainable from molecular maser type devices. This arises from the fact that the Larmor frequency of the gyromagnetic ensemble utilized for amplification or oscillation purposes, as previously described, is a direct function of the polarizing magnetic field in which the individual microscopic gyromagnetic bodies are immersed. Accordingly, all the embodiments of the present invention may be tuned over a relatively wide band of frequencies by varying the polarizing magnetic field intensity commensurate with the ability to maintain the accompanying coupling requisites as set forth in the preceding mathematical relationships. Of course, for tuning exceeding a certain amount the various tuned circuits coupled to the gyromagnetic ensemble will require tuning in variable accordance with the change in polarizing magnetic field intensity. Means for tuining lumped and distributed constant tuned circuits are deemed well-known in the art and thus for simplicity of explanation have not been shown.

In many instances throughout the foregoing description the various embodiments of the present invention have been depicted and described as they are applied to low frequency circuits, i.e., circuits employing lumped elements. However, the present invention is equally well applicable at microwave frequencies as demonstrated in some of the embodiments and the proper scope of the present invention includes all the microwave equivalents which are deemed well-known by those skilled in the art and therefore have not been shown.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The gyromagnetic method for obtaining coherent stimulated emission of radiation from an ensemble of gyromagnetic bodies, comprising the steps of placing the ensemble in a nonequilibrium energy state while immersed in a polarizing magnetic field, and magnetically coupling an electrical conductor to the ensemble whereby currents induced to flow in the conductor due to transitions of the ensemble produce an associated time varying magnetic field of sufficient amplitude back at the situs of the ensemble to produce regenerative coherent radiation from the ensemble.

2. The method according to claim 1 wherein the step of magnetically coupling an electrical conductor to the ensemble comprises the step of providing that degree of magnetic coupling between the electrical conductor and the gyromagnetic ensemble such that spontaneous regenerative oscillatory signals are produced in the coupled electrical conductor.

3. The method according to claim 1 including the step of applying a first time varying signal to the gyromagnetic ensemble to thereby produce transitions of bodies within the ensemble from a higher to a lower energy state whereby through the coupling between the electrical conductor and the gyromagnetic ensemble a second time varying signal similar to the first signal is induced in the conductor, the second similar time varying signal containing more power than the applied first time varying signal.

4. The method according to claim 2 wherein the electrical conductor comprises a portion of a resonant circuit, and the degree of coupling between the gyromagnetic ensemble and the resonant circuit is prescribed by the following inequality:

$$T_2 > \frac{1}{2\pi |\gamma| Q \eta M_0}$$

where $T_2$ is the transverse relaxation time of the gyromagnetic ensemble, $\gamma$ is the magnitude of the gyromagnetic ratio of the gyromagnetic bodies making up the ensemble, $Q$ is the quality factor of the resonant circuit, $\eta$ is the filling factor of the resonant circuit, and $M_0$ is the magnitude of the total magnetic moment of the ensemble in the nonequilibrium energy state.

5. The method according to claim 3 wherein the electrical conductor comprises a portion of a resonant circuit and the magnetic coupling between the gyromagnetic ensemble and the resonant circuit is prescribed substantially by the following approximate equality:

$$T_2 \simeq \frac{1}{2\pi |\gamma| Q \eta M_0}$$

6. The method for obtaining coherent stimulated emission of radiation from an ensemble of gyromagnetic bodies immersed in a polarizing magnetic field comprising the steps of magnetically coupling a resonant circuit to the gyromagnetic ensemble, raising the ensemble to a nonequilibrium energy state, and producing a sufficient number of transitions of the gyromagnetic bodies from the nonequilibrium energy state to a lower energy state whereby due to the closeness of the magnetic coupling between the resonant circuit and the ensemble regenerative transitions are caused to occur coherently thereby producing a coherent regenerative emission of radiation.

7. The method according to claim 6 wherein the step of raising the ensemble to the higher energy state comprises the step of applying a time varying magnetic field to the gyromagnetic ensemble substantially at the Larmor frequency thereof, said applied time varying magnetic field having a component thereof substantially at right angles to the polarizing magnetic field, and applying the time varying magnetic field to the ensemble for a period of time sufficient to raise the ensemble to a nonequilibrium energy state.

8. The method according to claim 7 wherein the duration of the period of application of time varying magnetic field satisfies the following inequality:

$$\frac{\pi}{2\gamma H_1} < T < \frac{3\pi}{2\gamma H_1}$$

where $T$ is the duration of the period of application of time varying magnetic field, where $\gamma$ is the gyromagnetic ratio of the gyromagnetic bodies making up the ensemble, and $H_1$ is the magnitude of the component of time varying magnetic field at right angles to the polarizing magnetic field.

9. The method according to claim 6 wherein the step of raising the ensemble of gyromagnetic bodies to the nonequilibrium energy state comprises the step of rapidly reversing the direction of the polarizing magnetic field with respect to the ensemble.

10. The method according to claim 6 wherein the step of raising a first gyromagnetic ensemble to the nonequilibrium energy state comprises the step of applying a time varying magnetic field to a sample of matter containing magnetically coupled first and second ensembles of gyromagnetic bodies at substantially the Larmor frequency of the second ensemble whereby the first ensemble having a different Larmor frequency is raised to the nonequilibrium energy state.

11. The method according to claim 10 wherein the time varying magnetic field which is applied to the sample of matter of sufficient amplitude to produce saturated resonance of the second ensemble whereby saturated resonance of the second ensemble of gyromagnetic bodies raises the first ensemble of gyromagnetic bodies to the higher energy state.

12. The method according to claim 6 wherein the step of raising the ensemble of gyromagnetic bodies to the higher energy state comprises the steps of subjecting the ensemble to a changing magnitude of polarizing magnetic field, and simultaneously therewith applying a time varying magnetic field to the gyromagnetic bodies at a frequency substantially equal to the Larmor frequency corresponding to the magnetic field intensity at the mid-point of the change in polarizing magnetic field whereby the ensemble is raised to the higher energy state.

13. The method according to claim 12 wherein the step of subjecting the ensemble to a changing magnitude of polarizing magnetic field comprises the step of passing the ensemble through a stationary linear gradient in the polarizing magnetic field, the gradient running in the direction of motion of the ensemble.

14. The method for providing continuous coherent stimulated emission of radiation comprising the steps of immersing a plurality of separate gyromagnetic ensembles in a polarizing magnetic field, closely coupling a resonant circuit to each of the separate ensembles whereby coherent emission of radiation may be obtained, raising one ensemble to the nonequilibrium energy state and then raising another ensemble to a nonequilibrium state such that at any instant of time there is always one ensemble in the nonequilibrium energy state, and successively coupling the ensemble in the nonequilibrium energy state to a load whereby continuous emission of radiation may be obtained, as desired.

15. The method for increasing the time during which a sample of matter containing an ensemble of gyromagnetic bodies may be utilized to obtain coherent emission of radiation therefrom comprising the steps of immersing the ensemble in a polarizing magnetic field, raising a first portion of the ensemble to a nonequilibrium energy state, tightly coupling the first portion of the ensemble to a resonant circuit to produce coherency of transitions when sufficient transitions are caused to occur, and rapidly replacing the first portion of the ensemble with the second portion of the ensemble when the first portion is no longer capable of providing a useful signal, and raising the second portion of ensemble to the nonequilibrium energy state whereby unwanted delay periods in the cycle of operation are minimized.

16. The method for continuously providing an ensemble of gyromagnetic bodies in a nonequilibrium energy state for electromagnetic interaction with a resonant circuit comprising the steps of immersing a sample of matter containing an ensemble of gyromagnetic bodies in a polarizing magnetic field, passing a portion of the sample of matter continuously and successively through a first and second region, raising the ensemble of gyromagnetic bodies to the nonequilibrium energy state within the first region, and passing the ensemble while in the nonequilibrium energy state to the second region wherein the ensemble may be induced to coherently give up its energy to the resonant circuit.

17. The method for detecting time varying electromagnetic signals comprising the steps of receiving the time varying electromagnetic signals, applying the signals to an ensemble of gyromagnetic bodies in a nonequilibrium energy state to stimulate emission of radiation therefrom, tightly coupling a resonant circuit to the ensemble to produce coherency of any stimulated emission of radiation therefrom whereby amplification of the applied signals is obtained, and detecting the amplified signals whereby extremely low noise detection of the time varying signals is obtained.

18. The method for amplifying gyromagnetic resonance signals comprising the steps of producing gyromagnetic resonance within a sample of matter under investigation and disposed in a polarizing magnetic field subject to certain minute fluctuations with time, deriving a resonance signal emanating from the sample under investigation, applying the resonance signal to an ensemble of gyromagnetic bodies in a nonequilibrium energy state and immersed in a polarizing magnetic field subject to substantially the same minute fluctuations with time to produce transitions of the ensemble from the higher to the lower energy state, and magnetically tightly coupling a resonant circuit to the ensemble of gyromagnetic bodies in the nonequilibrium energy state whereby low noise power amplification of signals applied to the gyromagnetic ensemble is obtained.

19. The method according to claim 18 including the step of immersing a second ensemble of gyromagnetic bodies in a polarizing magnetic field portion having substantially the same minute fluctuations with time as the magnetic field portion within which the first ensemble of gyromagnetic bodies is immersed, putting the second ensemble of gyromagnetic bodies in a nonequilibrium energy state, producing coherent stimulated emission of radiation from the second ensemble of gyromagnetic bodies, and applying this radiation to the sample of matter under investigation to produce gyromagnetic resonance thereof whereby an extremely stable gyromagnetic resonance may be obtained.

20. The method for obtaining extremely stable gyromagnetic resonance of a sample of matter immersed in a polarizing magnetic field comprising the steps of immersing an ensemble of gyromagnetic bodies in a polarizing magnetic field subject to substantially the same fluctuations with time as the polarizing magnetic field permeating the sample of matter under investigation, raising the ensemble of gyromagnetic bodies to a nonequilibrium energy state, producing spontaneous coherent emission of radiation from the ensemble, and applying the radiation to the sample of matter under investigation to produce gyromagnetic resonance thereof whereby an extremely stable gyromagnetic resonance is obtained.

21. The method for producing a signal in the frequency domain in variable accordance with a signal in the current domain comprising the steps of immersing an ensemble of gyromagnetic bodies in a polarizing magnetic field, raising the ensemble to a nonequilibrium energy state, producing coherent spontaneous emission of radiation from the ensemble, and varying the polarizing magnetic field intensity in variable accordance with a signal in the current domain to thereby produce a corresponding change in the frequency of the emitted radiation whereby a signal in the frequency domain is produced in variable accordance with a signal in the current domain.

22. The method for amplifying pulses of microwave signals comprising the steps of immersing an ensemble of gyromagnetic bodies in a polarizing magnetic field, periodically raising the ensemble to a nonequilibrium energy state, applying the periodic pulses of microwave signals to the gyromagnetic ensemble, sequencing the application of the pulses of microwave energy with the raising of the ensemble to the higher energy state such that on an average the ensemble is in a nonequilibrium energy state when a pulse of microwave energy is applied thereto, tightly magnetically coupling a resonant circuit to the gyromagnetic ensemble, and arranging the coupling between the ensemble and the resonant circuit such that coherent emission of radiation is obtained from the sample of matter when the application of microwave energy to the ensemble produces sufficient transitions of the ensemble from the nonequilibrium energy state to a lower energy state whereby an extremely low noise amplification of the microwave signals is obtained.

23. The method for detecting the difference in temperature between a first and second body comprising the steps of receiving radiant energy emanating from the first body and receiving radiant energy emanating from a second reference body, alternately applying the signals received from the first and second bodies to an ensemble of gyromagnetic bodies immersed in a polarizing magnetic field and placed in a nonequilibrium energy state, whereby the radiant signals obtained from the first and second bodies are alternately amplified, and comparing the amplified signals to obtain a signal in variable accordance with the difference in the temperature of the first and second body whereby an extremely sensitive measurement of the temperature difference may be obtained.

24. Apparatus for obtaining coherent simulated emission of radiation from an ensemble of gyromagnetic bodies including, means for placing the ensemble in a nonequilibrium energy state while immersed in a polarizing magnetic field, and comprising electrical conducting means magnetically coupled to the gyromagnetic ensemble whereby currents induced to flow in the conductor due to transitions of the ensemble produce an associated time varying magnetic field of sufficient amplitude back at the situs of the ensemble to produce regenerative coherent emission of radiation from the ensemble.

25. The apparatus according to claim 24 wherein the conducting means comprises a resonant circuit.

26. Apparatus for amplifying microwave signals comprising a gyromagnetic ensemble immersed in a polarizing magnetic field, means for raising the ensemble to a nonequilibrium energy state, means for applying microwave signals to the gyromagnetic ensemble, and resonant circuit means tightly magnetically coupled to the gyromagnetic ensemble whereby when sufficient transitions of the gyromagnetic ensemble from the higher to the lower energy state are induced a signal will be induced in the resonant circuit of sufficient amplitude to create a field back at the ensemble to produce coherent emission of radiation from the ensemble, and means for extracting the coherent emission of radiation.

27. The apparatus according to claim 26 wherein the means for applying the microwave signals to the gyromagnetic ensemble includes an antenna means for receiving the microwave signals, variable attenuator means disposed between said antenna means and said gyromagnetic ensemble for preventing the saturation of the gyromagnetic ensemble, isolator means disposed between said antenna means and said gyromagnetic ensemble to prevent the coupling of amplified signals from the gyromagnetic ensemble to said antenna means to prevent re-radiation of the microwave signals, and wherein said means for raising the gyromagnetic ensemble to the nonequilibrium energy state comprises means for applying a time varying magnetic field to the gyromagnetic ensemble at a frequency which is substantially higher than the frequency of the microwave signals.

28. In a gyromagnetic method, causing an ensemble of gyromagnetic bodies normally in a state of thermal equilibrium to be conditioned in a nonequilibrium and higher energy state, and then stimulating said ensemble to cause the same to coherently give up available energy in the form of electrical variations.

29. A gyromagnetic method as in claim 28 in which the stimulation of the ensemble is effected by applying signal energy thereto, whereby an amplified signal output is provided.

30. A gyromagnetic method as in claim 28 in which sustained electrical current oscillations are generated and supplied to an output.

31. In gyromagnetic apparatus, a sample of material containing gyromagnetic bodies normally in a state of thermal equilibrium, means for conditioning said bodies in a nonequilibrium and higher energy state, and means for deriving energy from the gyromagnetic bodies while in the nonequilibrium state, the energy being in the form of electrical current variations, said means serving to stimulate said ensemble to effect energy release.

32. Gyromagnetic apparatus as in claim 31 in which said last means includes an oscillatory system having inductive and capacitive components, said system being closely and inductively coupled to the sample.

References Cited in the file of this patent

UNITED STATES PATENTS

| | | |
|---|---|---|
| 2,589,494 | Hershberger | Mar. 18, 1952 |
| 2,677,758 | Robinson et al. | May 4, 1954 |
| 2,721,970 | Levinthal | Oct. 25, 1955 |
| 2,743,322 | Pierce et al. | Apr. 24, 1956 |
| 2,762,872 | Dicke | Sept. 11, 1956 |
| 2,793,360 | Beaumont | May 21, 1957 |
| 2,802,944 | Norton | Aug. 13, 1957 |
| 2,820,944 | Bradley | Jan. 21, 1958 |
| 2,909,654 | Bloembergen | Oct. 20, 1959 |

OTHER REFERENCES

Article by Bloembergen et al. in Physical Review, vol. 73, No. 7, April 1, 1948, pages 679–712.

Article by Feher et al. and Scovil et al. in Physical Review, vol. 105, No. 2, January 1957, pages 760–763.

Article in Electrical Engineering, April 1957, pages 355–356.

Article by Damon in Aviation Week, August 19, 1957, pages 76, 77, 81, 82, and 89.

UNITED STATES PATENT OFFICE
CERTIFICATE OF CORRECTION

Patent No. 3,075,156            January 22, 1963

Weston A. Anderson et al.

It is hereby certified that error appears in the above numbered patent requiring correction and that the said Letters Patent should read as corrected below.

Column 2, line 4, for "ensemblies" read -- ensembles --; column 5, line 63, for "though" read -- thought --; line 70, for "quatum-mechanical" read -- quantum-mechanical --; column 10, line 16, for "turn" read -- turns --; column 11, line 50, for "thremal" read -- thermal --; column 21, line 65, for "tof" read -- to --; column 22, lines 23 and 24, for "gyromagntic" read -- gyromagnetic --; column 25, line 34, for "action" read -- active --; column 26, line 55, for "tuining" read -- tuning --; column 30, line 39, for "simulated" read -- stimulated --.

(SEAL)       Signed and sealed this 3rd day of September 1963.
Attest:

ERNEST W. SWIDER            DAVID L. LADD
Attesting Officer            Commissioner of Patents